US007840361B2

(12) United States Patent
Kumazawa et al.

(10) Patent No.: US 7,840,361 B2
(45) Date of Patent: Nov. 23, 2010

(54) METHOD FOR CALCULATING ENVIRONMENTAL LOAD, PROGRAM FOR CALCULATING ENVIRONMENTAL LOAD, AND METHOD FOR CONVERTING UNITS

(75) Inventors: Takaaki Kumazawa, Chigasaki (JP); Noriaki Yamamoto, Zushi (JP); Yoshiharu Sekiya, Chikusei (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 11/943,966

(22) Filed: Nov. 21, 2007

(65) Prior Publication Data

US 2008/0208473 A1     Aug. 28, 2008

(30) Foreign Application Priority Data

Nov. 24, 2006  (JP)  ............... 2006-317562

(51) Int. Cl.
*G01N 31/00* (2006.01)
(52) U.S. Cl. .............. 702/30; 702/22; 702/85; 702/182; 700/95; 700/97
(58) Field of Classification Search .......... 702/30–32, 702/85; 707/821–822, 828
See application file for complete search history.

(56) References Cited

U.S. PATENT DOCUMENTS

| 7,003,437 | B2 * | 2/2006 | Ichikawa et al. ........... 702/189 |
| 7,243,032 | B2 * | 7/2007 | Sakurai et al. ............ 702/30 |
| 7,340,351 | B2 | 3/2008 | Oyasato et al. |
| 2002/0133302 | A1 * | 9/2002 | Matsui et al. ............. 702/30 |
| 2002/0143473 | A1 * | 10/2002 | Kobayashi et al. ......... 702/23 |
| 2004/0054516 | A1 * | 3/2004 | Oyasato et al. ........... 703/22 |
| 2008/0015720 | A1 | 1/2008 | Oyasato et al. |

FOREIGN PATENT DOCUMENTS

| DE | 103 29 071 | 1/2004 |
| EP | 1 193 628 | 4/2002 |
| EP | 1 207 469 | 5/2002 |
| EP | 1 324 251 | 7/2003 |

(Continued)

OTHER PUBLICATIONS

Tanaka G et al., "Development of Pluggable LCA System", Dec. 8, 2003, pp. 687-691.

(Continued)

*Primary Examiner*—Hal D Wachsman
*Assistant Examiner*—Mi'schita' Henson
(74) *Attorney, Agent, or Firm*—Antonelli, Terry, Stout & Kraus, LLP.

(57) ABSTRACT

A technology is provided in which it is not necessary to modify a system on a production side, and in which manhours required for registering an environmental load value on a supplier side are not increased, in cases of an item having a mismatch between units, in a process of adding up the environmental load values of a post-production product. The technology includes generating correction information for calculating the environmental load that is registered by the supplier at design time, and calculating the environmental load value at design time by using the correction information. In cases of calculating the environmental load value of a product actually produced from a designed product, the environmental load value is calculated using the correction information generated at design time.

2 Claims, 21 Drawing Sheets

FOREIGN PATENT DOCUMENTS

| | | |
|---|---|---|
| EP | 1 564 665 | 8/2005 |
| EP | 1 818 865 | 8/2007 |
| JP | 2003-256504 | 9/2003 |
| JP | 2005-071338 | 3/2005 |
| JP | 2007-172290 | 7/2007 |

OTHER PUBLICATIONS

Rebitzer G et al., "The role and implementation of LCA within life cycle management at Alcan", vol. 13, No. 13-14, Nov. 1, 2005, pp. 1327-1335.

* cited by examiner

| 501 | 502 | 503 | 504 | 505 | 506 | |
|---|---|---|---|---|---|---|
| SUPPLIER CODE | SUPPLIER ITEM NUMBER | LOT NUMBER | SUBSTANCE CODE | CONTENT | REGISTRATION UNIT | ... |
| aaa-1 | aaa-11 | a-123 | Pb | 10mg | PARTS | ... |
| aaa-1 | aaa-11 | a-123 | Cd | 20mg | PARTS | ... |
| aaa-1 | aaa-11 | a-123 | Cr | 30mg | PARTS | ... |
| aaa-2 | aaa-22 | a-222 | Pb | 20mg | PARTS | ... |
| aaa-2 | aaa-22 | a-222 | Cd | 30mg | PARTS | ... |
| bbb | bbb-1 | b-123 | Pb | 10mg | PARTS | ... |
| bbb | bbb-1 | b-123 | Cd | 10mg | PARTS | ... |
| ddd | ddd-1 | d-123 | Cr | 1000 mg | PARTS | ... |
| ... | ... | ... | ... | | | |

FIG. 7

| ITEM CODE | SUPPLIER CODE | SUPPLIER ITEM NUMBER | ... |
|---|---|---|---|
| a001 | aaa - 1 | aaa - 11 | ... |
| a001 | aaa - 2 | aaa - 22 | ... |
| b001 | bbb | bbb - 1 | ... |
| c001 | ccc | ccc - 1 | ... |
| d001 | ddd | ddd - 1 | ... |
| e001 | - | - | ... |
| f001 | - | - | |
| g001 | - | | |

- 801 — PRODUCTION INSTRUCTION NO. : 12345
- 802 — ITEM CODE : g001
- 803 — PRODUCT PRODUCING INSTRUCTION COUNT : 10 PARTS
- 804 — LOT NUMBER : g-123

| PRODUCTION PROCESS | INSTRUCTION COUNT | ITEM CODE | REQUIRED QUANTITY | UNIT | ... |
|---|---|---|---|---|---|
| ASSEMBLY 1 | 20 | a001 | 40 | PARTS | ... |
| ASSEMBLY 1 | 20 | b001 | 100 | PARTS | ... |
| ASSEMBLY 2 | 20 | e001 | 20 | PARTS | ... |
| ASSEMBLY 2 | 20 | c001 | 20 | PARTS | ... |
| ASSEMBLY 3 | 10 | f001 | 20 | PARTS | ... |
| ASSEMBLY 3 | 10 | d001 | 30 | m | |

| 1001 | ~ PRODUCTION INSTRUCTION NO. :12345 |
| 1002 | ~ ITEM CODE           : g001 |
| 1003 | ~ PRODUCT PRODUCTION INSTRUCTION COUNT : 10 PARTS |
| 1004 | ~ LOT NUMBER          : g-123 |

| PRODUCTION PROCESS | ITEM CODE | SUPPLIER CODE | SUPPLIER ITEM NUMBER | LOT NUMBER | ... |
|---|---|---|---|---|---|
| ASSEMBLY 1 | a001 | aaa-1 | aaa-11 | a-123 | ... |
| ASSEMBLY 1 | b001 | bbb-1 | bbb-11 | b-123 | ... |
| ASSEMBLY 2 | e001 | – | – | e-123 | ... |
| ASSEMBLY 2 | c001 | ccc | ccc-11 | c-123 | ... |
| ASSEMBLY 3 | f001 | – | – | f-123 | ... |
| ASSEMBLY 3 | d001 | ddd | ddd-11 | d-123 | ... |

1011  1012  1013  1014  1015

| | | | | |
|---|---|---|---|---|
| 1001 | PRODUCTION INSTRUCTION NO. : 12345 | | | |
| 1002 | ITEM CODE : g001 | | | |
| 1003 | PRODUCT PRODUCTION INSTRUCTION COUNT : 10 PARTS | | | |
| 1004 | LOT NUMBER : g-123 | | | |

| PARENT PART NUMBER | CHILD PART NUMBER | ITEM COUNT | UNIT | ... |
|---|---|---|---|---|
| g001-1-123 | f001-1-123 | 2 | PARTS | ... |
| g001-1-123 | d001-1-123 | 3 | m | ... |
| f001-1-123 | e001-1-123 | 1 | PARTS | ... |
| f001-1-123 | c001-1-123 | 1 | PARTS | ... |
| e001-1-123 | a001-1-123 | 2 | PARTS | ... |
| e001-1-123 | b001-1-123 | 5 | PARTS | ... |

1201 — PRODUCTION INSTRUCTION NO. :12345
1202 — ITEM CODE            :  g001
1203 — PRODUCT PRODUCTION INSTRUCTION COUNT : 10 PARTS
1204 — LOT NUMBER        :  g-123

| PART NUMBER | ITEM CODE | SUPPLIER CODE | SUPPLIER ITEM NUMBER | LOT NUMBER | ... |
|---|---|---|---|---|---|
| a001-1-123 | a001 | aaa-1 | aaa-11 | a-123 | ... |
| b001-1-123 | b001 | bbb | bbb-1 | b-123 | ... |
| c001-1-123 | c001 | ccc | ccc-1 | c-123 | ... |
| d001-1-123 | d001 | ddd | ddd-1 | d-123 | ... |
| e001-1-123 | e001 | - | - | e-123 | ... |
| f001-1-123 | f001 | - | - | f-123 | ... |
| g001-1-123 | g001 | - | - | g-123 | |

Table 171:

| ITEM CODE (1301) | SUPPLIER CODE (1302) | SUPPLIER ITEM NUMBER (1303) | REGISTRATION UNIT (1304) | UNIT (1305) | CORRECTION COEFFICIENT (1306) | ... |
|---|---|---|---|---|---|---|
| ... | ... | ... | ... | ... | ... | ... |
| ... | ... | ... | ... | ... | ... | ... |
| ... | ... | ... | ... | ... | ... | ... |
| d001 | ddd | ddd - 1 | PARTS | m | 0.002 | ... |
| ... | ... | ... | ... | ... | ... | ... |

FIG. 14

Table 172:

| UNIT (1401) | REGISTRATION UNIT (1402) | CORRECTION COEFFICIENT (1403) |
|---|---|---|
| g | kg | 0.001 |
| g | g | 1 |
| g | mg | 1000 |
| ... | ... | ... |
| ... | ... | |

| | | | |
|---|---|---|---|
| 1501 — PRODUCTION INSTRUCTION NO. : g001-1-153 | | | |
| 1502 — ITEM CODE : g001 | | | |
| 1503 — ITEM NAME : PRODUCTg | | | |
| 1504 — LOT NUMBER : g153 | | | |

| CHEMICAL SUBSTANCE CODE | CONTENT | RESULT | |
|---|---|---|---|
| Pb | 200mg | OK | ... |
| Cd | 300mg | OK | ... |

1511   1512   1513

METHOD FOR CALCULATING ENVIRONMENTAL LOAD, PROGRAM FOR CALCULATING ENVIRONMENTAL LOAD, AND METHOD FOR CONVERTING UNITS

This application claims a priority from the Japanese Patent Application No. 2006-317562 filed on Nov. 24, 2006, the entire content of which is incorporated by reference herein.

BACKGROUND OF THE INVENTION

The present invention relates to a technology for calculating an environmental load of a product.

At the present time, environmental regulations such as, for example, restriction of hazardous substances (RoHS) and energy using products (EuP), are being strengthened, centered on Europe. These regulations entail a precise evaluation of environmental load of a product on the side of the manufacturer.

A method for evaluating the environmental load of a product is exemplified by a method for evaluating a chemical substance contained in the product and a life cycle assessment (LCA) for evaluating quantity of $CO_2$ or the like discharged during a period of time from production to discarding of a product. This type of environmental impact evaluation is carried out from composition information indicating items from which the product is composed and environmental load information for each item. Specifically, for instance, in the case of evaluating a chemical substance, a manufacturer obtains chemical substance information on all of items described in the composition information of the product from the retailing enterprise (supplier) of the respective items. The manufacturer adds up the obtained chemical substance information and computes the chemical substances contained in the product, thereby calculating the environmental load.

In order to reliably comply with the laws and regulations, generally, the chemical substances are evaluated at two stages: at product design and after producing the product.

A technology for calculating the environmental load of the product at the design stage is disclosed in Japanese Patent Laid-open Publication number 2003-256504. Items are described in item codes in an item table used for calculating the environmental load of the product at the design stage. The respective item codes are in some cases associated with item numbers of a plurality of suppliers in order to optimize production lead time and cost. Namely, one item code represents, as the case may be, an item supplied by each of the plurality of suppliers, or a plurality of items supplied by one supplier. Therefore, the evaluation at the design stage involves envisaging a worst case among all the items that may be used, so that there will be no problem when any one of the items is used.

The evaluation of the environmental load after production is conducted with respect to items actually used in producing the product. Herein, as described above, there are cases in which one item code represents an item supplied by each of the plurality of suppliers and a plurality of items supplied by one supplier. Namely, even with an item specified by the same item code, there are cases in which the content of chemical substances contained in the item is different. The evaluation of the environmental load at the design stage is done on the assumption of the worst case. However, the evaluation of the environmental load after production involves accurately evaluating the chemical substances corresponding to the item composition for each product actually produced.

The environmental load of the product is tallied by multiplying the quantity of each used item by the environmental load of this item, and adding up for a product unit. Herein, the compositional information and the information on the items actually used for producing the product (actual results information), are created by a company itself. On the other hand, the environmental load information of the item is obtained from the supplier. Thus, the information on the items which compose the product and the environmental load information of each item have different registration sources. Hence, there might be a case where the usage quantity unit of the used quantity of an item does not match the registered unit of the environmental load information.

As a solution to this problem, a method can be considered in which the supplier is provided with an item table and the units used for the actual results information, and the environmental load information is registered in units designated by the supplier. There are cases in which the units described in the item table and in the actual results information, even of the same items, might differ depending on business division. In such cases, according to the method given above, the supplier must change and register the environmental load information for each delivery destination. As a result, there arises a problem in that the number of man-hours for registration by the supplier increases, which causes a delay in collecting the environmental load information.

An other solution is a method of changing the usage quantity unit of the item in accordance with the registration unit of the environmental load information registered by the supplier. The usage quantity of the item described in the item table is, however, utilized also for procuring the item and for production management, and the registration unit of the chemical substance information does not necessarily suit the purpose thereof. Hence, if the unit in the item table is changed, there arises a problem in that existing systems, such as a production management system, need reconfiguring, and the number of man-hours for developing the system increases.

SUMMARY OF THE INVENTION

It is an object of the present invention to provide a technology capable of automatically and accurately calculating an environmental load of an actually-produced product, corresponding to item composition for each individual product.

It is another object of the present invention to provide a technology enabling an environmental load to be computed without increasing the number of man-hours for registering environmental load information of a supplier nor affecting an existing production management system.

The present invention, which has been devised to accomplish the objects given above, is distinguished in that an environmental load value is calculated using, in a second evaluation system, conversion information employed for converting a different unit in a first evaluation system.

The present invention provides a method for calculating an environmental load, by which each of: a design product evaluation system which calculates an environmental load value when designing a product composed from a plurality of items, and a production product evaluation system which calculates the environmental load value of the product produced by a production system, calculates the environmental load value of the product from the environmental load value per registration unit of each of the plurality of items, the method including: a first conversion step, executed by the design product evaluation system including a storage device which stores conversion information for converting the registration unit into a usage quantity unit applied in the production system, for each of the plurality of items, of converting the environmental load value in the registration unit, into the environmental load value in the usage quantity unit based on the conversion information for each of the plurality of items that make up the product to be designed; a first environmental load calculation step, executed by the design product evaluation system, of calculating the environmental load value of the product to be designed, from the conversion result; a first output step, executed by the design product evaluation system, of outputting the environmental load value of the product to be designed, to a first output device; a step, executed by the production product evaluation system, of acquiring the conversion information; a second conversion step, executed by the production product evaluation system, of converting the environmental load value in the registration unit, into the environmental load value in the usage quantity unit based on the conversion information for each of the plurality of items that make up the product produced by the production system; a second environmental load calculation step, executed by the production product evaluation system, of calculating the environmental load value of the product produced by the production system from the conversion result; and a second output step, executed by the production product evaluation system, of outputting the calculated environmental load value to a second output device.

According to the present invention, the supplier can set the units of the environmental loads of the items to be delivered arbitrarily. This eliminates the necessity of registering the environmental load in different units corresponding to a delivery destination or the like, and enables the number of man-hours to be reduced. Further, the manufacturer can use the environmental load unit registered by the supplier as it is. Accordingly, the elimination of the necessity of changing the units used for the design process, production process, and the like, enables the number of man-hours required in developing the system to be decreased.

BRIEF DESCRIPTION OF THE DRAWINGS

In the accompanying drawings:

FIG. 5 is a diagram showing one example of a chemical substance information table in the embodiment;

FIG. 7 is a diagram showing one example of an item master table in the embodiment;

FIG. 8 is a diagram showing one example of a production instruction information table in the embodiment;

FIG. 10 is a diagram showing one example of an actual results configuration table in the embodiment;

FIG. 12 is a diagram showing one example of the actual results item information table in the embodiment;

FIG. 13 is a diagram showing one example of a correction information table in the embodiment;

FIG. 14 is a diagram showing one example of the correction master information table in the embodiment;

FIG. 15 is a diagram showing one example of an evaluation information table in the embodiment;

DESCRIPTION OF THE PREFERRED EMBODIMENT

An in-depth description of one embodiment of the present invention will hereinafter be made with reference to the drawings.

Figure 1:
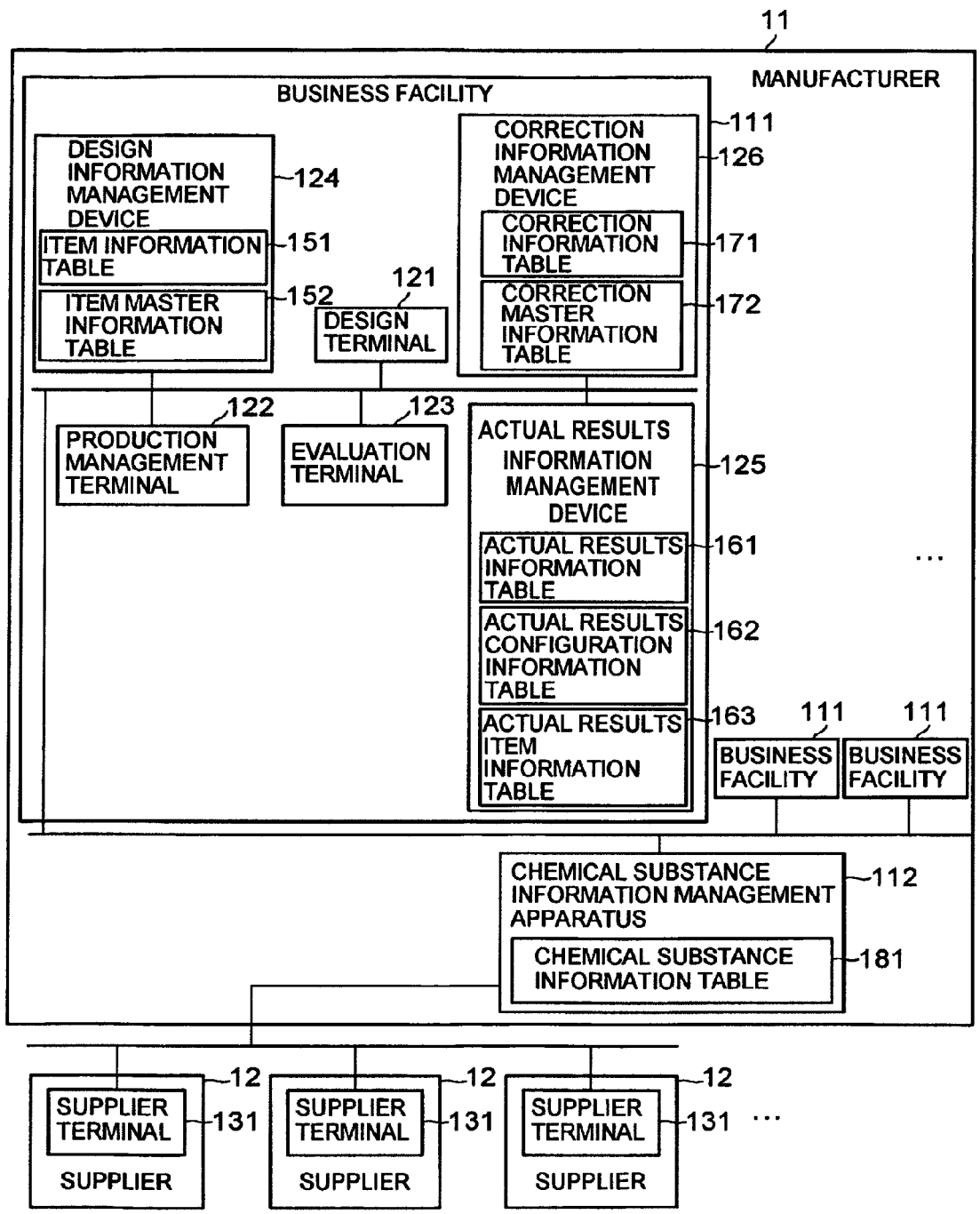
FIG. 1 is a diagram illustrating an example of a system configuration in one embodiment.

Referring first to FIG. 1, an example of a system configuration of this embodiment will be described. It should be noted that the embodiment, which will hereinafter be discussed, will exemplify a case of calculating an environmental load of a chemical substance; however, the present invention is not limited to this exemplification.

Note that in the following description, members used for producing components, the components, intermediate products produced from the members, the components, and the like, and products are generically termed "items".

Referring again to FIG. 1, the system in this embodiment is comprises an apparatus of a manufacturer 11 and an apparatus of a supplier 12. The manufacturer 11 produces a product by use of items purchased from the supplier 12. The apparatus of the manufacturer 11 is connected to the apparatus of the supplier 12 via an arbitrary communication network such as the Internet or a private line.

The manufacturer 11 has a plurality of business facilities 111 and a chemical substance information management apparatus 112. Each of the business facilities 111 includes a design terminal 121, a production management terminal 122, an evaluation terminal 123, a design information management device 124, an actual results information management device 125, a correction information management device 126, and so on. The design terminal 121, the production management terminal 122, the evaluation terminal 123, the design information management device 124, the actual results information management device 125, the correction information management device 126, and the like, of each of the business facilities 111 are connected to the chemical substance information management apparatus 112 via an arbitrary communication network such as a local area network (LAN). Further, the design terminal 121, the production management terminal 122, the evaluation terminal 123, the design information management device 124, the actual results information management device 125, the correction information management device 126, and the like, of each of the business facilities 111 are connected to each other via an arbitrary communication network such as a LAN.

The design terminal 121 is used by an employee or the like of a design division. The production management terminal 122 is used by an employee or the like of a production management division. The evaluation terminal 123 is used by an employee or the like of an evaluation division in which an environmental load of a produced product is calculated. The design terminal 121, the production management terminal 122, and the evaluation terminal 123 are arbitrary information terminals such as personal computers (PCs).

Each of the design information management device 124, the actual results information management device 125, the correction information management device 126, the chemical substance information management apparatus 112, and the like, has a storage medium such as a compact disc-recordable (CD-R) or a digital versatile disk-random access memory (DVD-RAM), a drive for the storage medium, and a writable/readable storage device (not shown) such as a hard disk drive (HDD). The design information management device 124, the actual results information management device 125, the correction information management device 126, the chemical substance information management apparatus 112, and the like may also be information processing equipment such as a server.

In the design information management device 124, the storage device thereof retains an item information table 151, an item master information table 152, and the like. The item information table 151 and the item master information table 152 store the items and the like from which the product is composed. Pieces of information in the item information table 151 and the item master information table 152 are inputted from the production management terminal 122.

In the actual results information management device 125, the storage device thereof stores an actual results information table 161, an actual results configuration information table 162, an actual results item information table 163, and the like. The actual results information table 161, the actual results configuration information table 162, and the actual results item information table 163 store the items and the like that make up the actually produced product. Pieces of information in the actual results information table 161, the actual results configuration information table 162, and the actual results item information table 163 are inputted from the evaluation terminal 123.

In the correction information management device 126, the storage device thereof has a correction information table 171, a correction master information table 172, and the like. The correction information table 171 and the correction master information table 172 store information for correcting units of environmental loads of the items that make up the product.

Note that FIG. 1 illustrates the devices of only one business facility 111. However, it is assumed that each of the business facilities 111 has the same devices.

The chemical substance information management apparatus 112 includes a chemical substance information table 181 and the like. The chemical substance information table 181 contains information on the chemical substance per item. This information is inputted from a supplier terminal 131 which will be mentioned later.

Each supplier 12 has the supplier terminal 131. The supplier terminal 131 of each supplier 12 is connected to the chemical substance information management apparatus 112 via the arbitrary communication network. The supplier terminal 131 registers the information on the chemical substance of the item in the chemical substance information management apparatus 112. The supplier terminal 131 is an arbitrary information terminal such as the PC.

Note that FIG. 1 exemplifies the single manufacturer 11 and the three suppliers 12; however, the numbers thereof may be arbitrary. Further, there may be provided arbitrary numbers of the business facilities 111 and the chemical substance information management apparatuses 112 in each business facility 111. Still further, there may also be provided arbitrary numbers of the design terminals 121, the production management terminals 122, the evaluation terminals 123, the design information management devices 124, and the actual results information management devices 125 in each of the business facilities 111 and an arbitrary number of the supplier terminals 131 in each supplier 12.

Next, each of the devices will be described in detail.

To begin with, an example of a configuration of each device will be explained.

Figure 2:
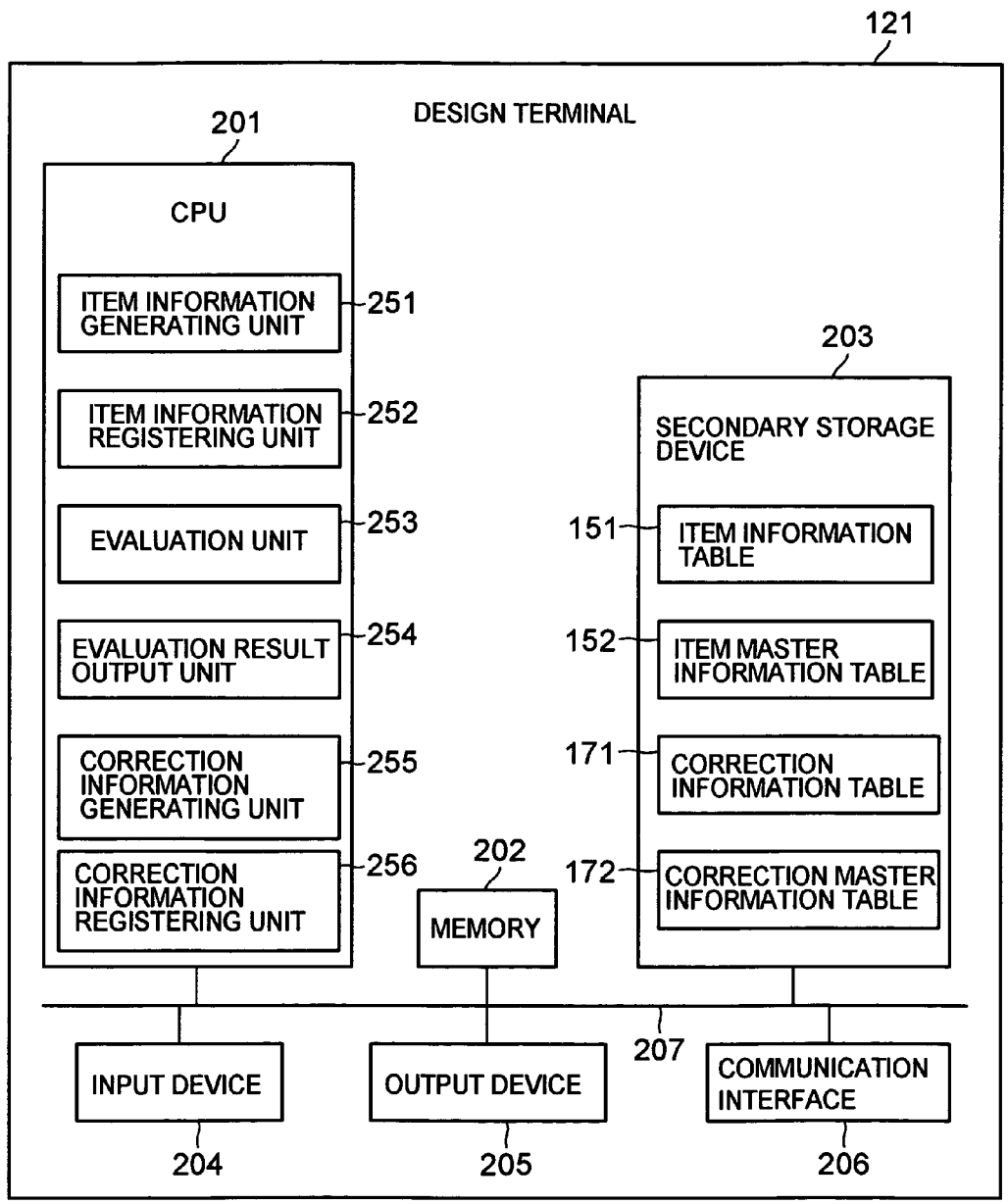
FIG. 2 is a diagram showing an example of a configuration of a design terminal in the embodiment.

At the first onset, an example of a configuration of the design terminal 121 will be described with reference to FIG. 2.

The design terminal 121 includes a central processing unit (CPU) 201, a memory 202, a secondary storage device 203, an input device 204, an output device 205, a communication interface 206, and the like. The CPU 201, the memory 202, the secondary storage device 203, the input device 204, the output device 205, the communication interface 206, and the like are connected to each other via a bus 207.

The secondary storage device 203 is exemplified by the storage medium such as the CD-R or the DVD-RAM, the drive for the storage medium, the HDD, and the like. The secondary storage device 203 stores the item information table 151, the item master information table 152, the correction information table 171, the correction master information table 172, and the like.

The item information table 151 and the item master information table 152 are the same as those stored in the design information management device 124 described above. The correction information table 171 and the correction master information table 172 are the same as those retained in the correction information management device 126 described above.

Detailed explanations of the correction information table 171, the correction master information table 172, the item information table 151, and the item master information table 152 will be made later.

The input device 204 is exemplified by, for example, a keyboard, a mouse, a microphone, a scanner, and so on. The output device 205 is exemplified by, for example, a display, a printer, a loudspeaker, and so forth. The design terminal 121 is connected to another device via a communication interface 206.

The CPU 201 executes a program (not shown) loaded into the memory 202, thereby realizing an item information generating unit 251, an item information registering unit 252, an evaluation unit 253, an evaluation result output unit 254, a correction information generating unit 255, a correction information registering unit 256, and the like. The item information generating unit 251 generates the item information table 151 and the item master information table 152. The item information registering unit 252 registers the item information table 151 and the item master information table 152 in the design information management device 124. The evaluation unit 253 calculates an environmental load value of a designed product. The evaluation result output unit 254 outputs the thus-calculated environmental load value. The correction information generating unit 255 generates the correction information table 171, the correction master information table 172, and the like. The correction information registering unit 256 registers the correction information table 171 and the correction master information table 172 in the correction information management device 126.

Figure 3:
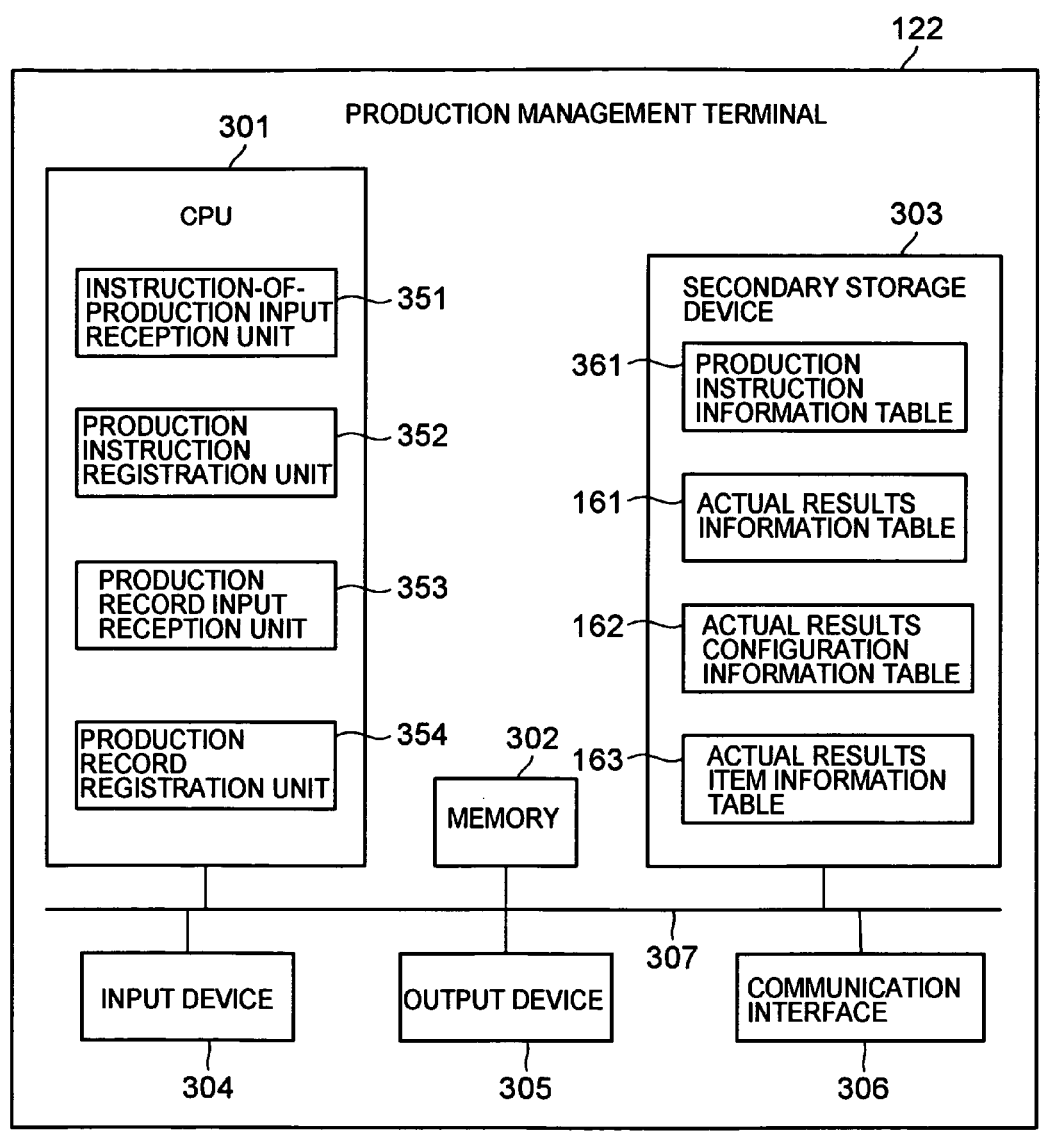
FIG. 3 is a diagram showing an example of a configuration of a production management terminal in the embodiment.

Next, an example of the configuration of the production management terminal 122 will be described with reference to FIG. 3.

The production management terminal 122 includes a CPU 301, a memory 302, a secondary storage device 303, an input device 304, an output device 305, a communication interface 306, and the like. The CPU 301, the memory 302, the secondary storage device 303, the input device 304, the output device 305, the communication interface 306, and the like are connected to each other via a bus 307.

The secondary storage device 303 is exemplified by the storage medium such as the CD-R or the DVD-RAM, the drive for the storage medium, the HDD, and the like. The secondary storage device 303 stores a production instruction information table 361, the actual results information table 161, the actual results configuration information table 162, the actual results item information table 163, and the like.

A production instruction information table 361 stores instruction information for actually producing the product. The actual results information table 161, the actual results configuration information table 162, and the actual results item information table 163 are the same as those retained in the actual results information management device 125 described above.

Detailed explanations of the production instruction information table 361, the actual results information table 161, the actual results configuration information table 162, and the actual results item information table 163 will be made later.

The input device 304 is exemplified by, for example, a keyboard, a mouse, a microphone, a scanner, and so on. The output device 305 is exemplified by, for example, a display, a printer, a loudspeaker and so forth. The production management terminal 122 is connected via a communication interface 306 to another device.

The CPU 301 executes a program (not shown) loaded into the memory 302, thereby realizing an production instruction input reception unit 351, a production instruction registering unit 352, a production record input reception unit 353, a production record registering unit 354 and so on. The production instruction input reception unit 351 generates a production instruction information table 361. The production instruction registering unit 352 stores the production instruction information table 361. The production record input reception unit 353 generates the actual results information table 161, the actual results configuration information table 162, and the actual results item information table 163. The production record registering unit 354 registers the actual results information table 161, the actual results configuration information table 162, and the actual results item information table 163 in the actual results information management device 125.

Figure 4:
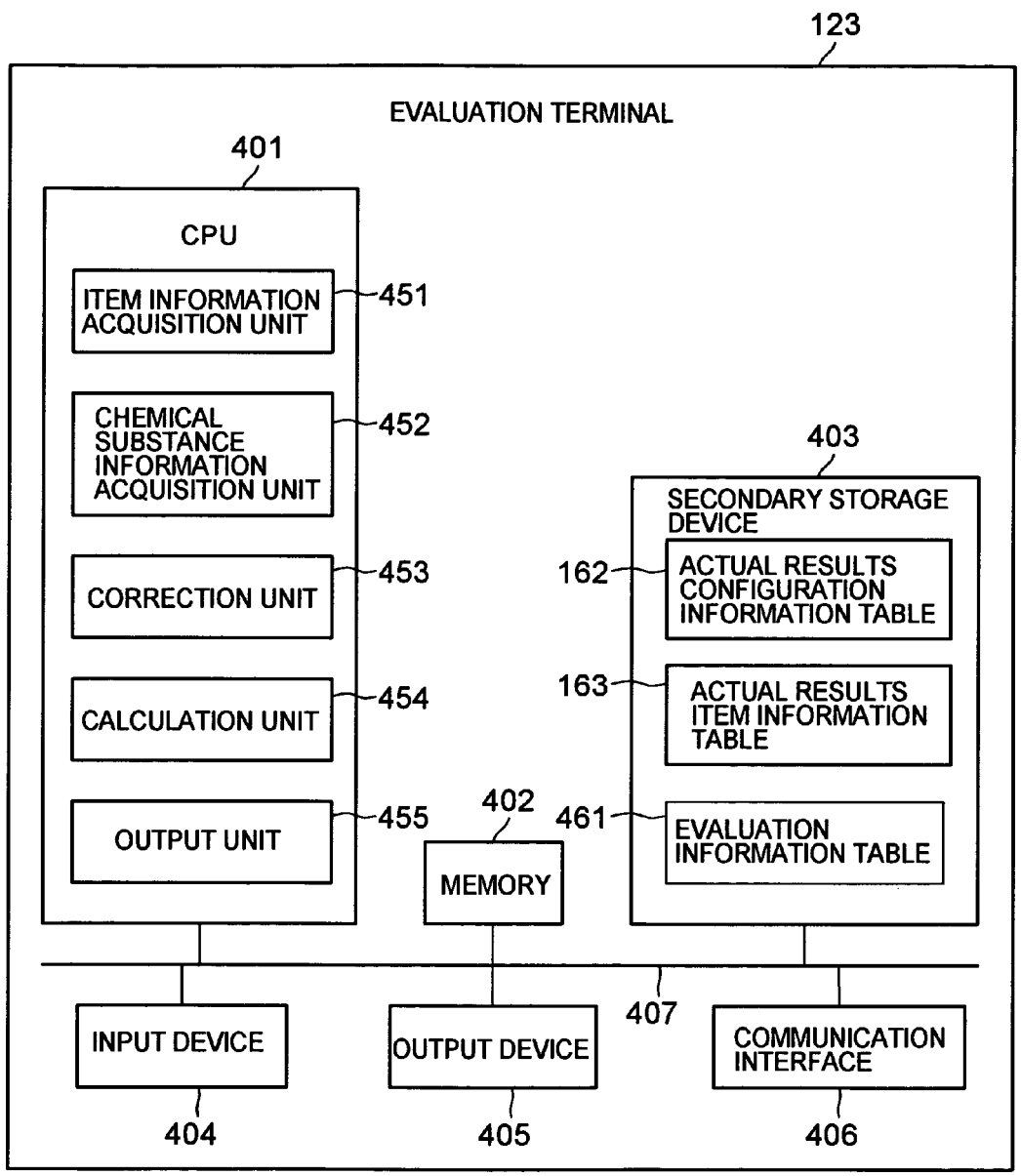
FIG. 4 is a diagram showing an example of a configuration of an evaluation terminal in the embodiment.

Next, the example of the configuration of the evaluation terminal 123 will be described with reference to FIG. 4.

The evaluation terminal 123 includes a CPU 401, a memory 402, a secondary storage device 403, an input device 404, an output device 405, a communication interface 406, and the like. The CPU 401, the memory 402, the secondary storage device 403, the input device 404, the output device 405, the communication interface 406, and the like are connected to each other via a bus 407.

The secondary storage device 403 is exemplified by the storage medium such as the CD-R or the DVD-RAM, the drive for the storage medium, the HDD, and the like. The secondary storage device 403 stores the actual results configuration information table 162, the actual results item information table 163, an evaluation information table 461, and the like.

The actual results configuration information table 162 and the actual results item information table 163 are the same as those retained in the actual results information management device 125 described above. The evaluation information table 461 stores information on a result of calculating the environmental load of the actually produced product.

Detailed explanations of the evaluation information table 461 will be made later.

The input device 404 is exemplified by, for example, a keyboard, a mouse, a microphone, a scanner, and so on. The output device 405 is exemplified by, for example, a display, a printer, a loudspeaker and so forth. The evaluation terminal 123 is connected via a communication interface 406 to another device.

The CPU 401 executes a program (not shown) loaded into the memory 402, thereby realizing an item information acquisition unit 451, a chemical substance information acquisition unit 452, a correcting unit 453, a calculation unit 454, an output unit 456, and the like. The item information acquisition unit 451 reads the item information table 151, the item master information table 152, and the like from the design information management device 124. The chemical substance information acquisition unit 452 reads the actual results configuration information table 162 and the actual results item information table 163, and the like from the actual results information management device 125. The correcting unit 453 corrects the environmental load unit of each of the items that make up the produced product based on the information of the read tables, the information in the correction information table 171, and the information in the correction master information table 172. The calculation unit 454 calculates the environmental load of the product by use of the value corrected by the correcting unit 453. The output unit 456 outputs the calculated environmental load from the output device 408, the communication interface 406, and the like.

Next, one example of each of the tables described above will be explained with reference to the drawings.

First, one example of the chemical substance information table 181 will be explained with reference to FIG. 5.

The chemical substance information table 181 has fields such as a supplier code 501, a supplier item number 502, a lot number 503, a substance code 504, content 505, a registered unit 506. The fields (data) in each row (record) are associated with each other.

The supplier code 501 is defined as identifying information of the supplier 12. The supplier item number 502 is identifying information for the item used in the office of the supplier 12 specified by the associated supplier code 501. The lot number 503 is a lot number of the item specified by the associated supplier item number 502. A combination of the supplier code 501, the supplier item number 502, and the lot number 503 enables the actual item used for producing the product specified. The substance code 504 specifies a chemical substance contained in the item specified by the supplier code 501, the supplier item number 502, and the lot number 503, which are associated therewith. The content 505 is content of the associated chemical substance. The registered unit 506 is a unit of the associated content 505.

Specifically, for example, FIG. 5 shows an example in which the single item specified by the supplier code 501 "aaa-1", the supplier item number 502 "aaa-11", and the lot number 503 "a-123", contains content 505 "10 mg" associated with the substance code 504 "Pb (lead)", content 505 "20 mg" associated with the substance code 504 "Cd (cadmium)", and content 505 "30 mg" associated with the substance code 504 "Cr (chromium)".

It is to be noted that in this embodiment, the information used for calculating the environmental load is identified by using the code (the supplier item number 502) that is employed by the supplier providing the item, as it is. This scheme facilitates the registration of the chemical substance by the supplier.

Furthermore, in the example of FIG. 5, notation of the substance code 504 involves using element symbols to simplify the explanation. The information specifying the substance code 504 may, though not particularly limited, involves making use of codes widely employed in related industry circles in order for the plurality of suppliers to register the information by unified standards. As a widely used substance code, for example, codes defined by the Chemical Abstracts Service (CAS) which is one sector of the American Chemical Society, may be cited.

Next, one example of the item information table 151 will be explained with reference to FIG. 6.

Figure 6:
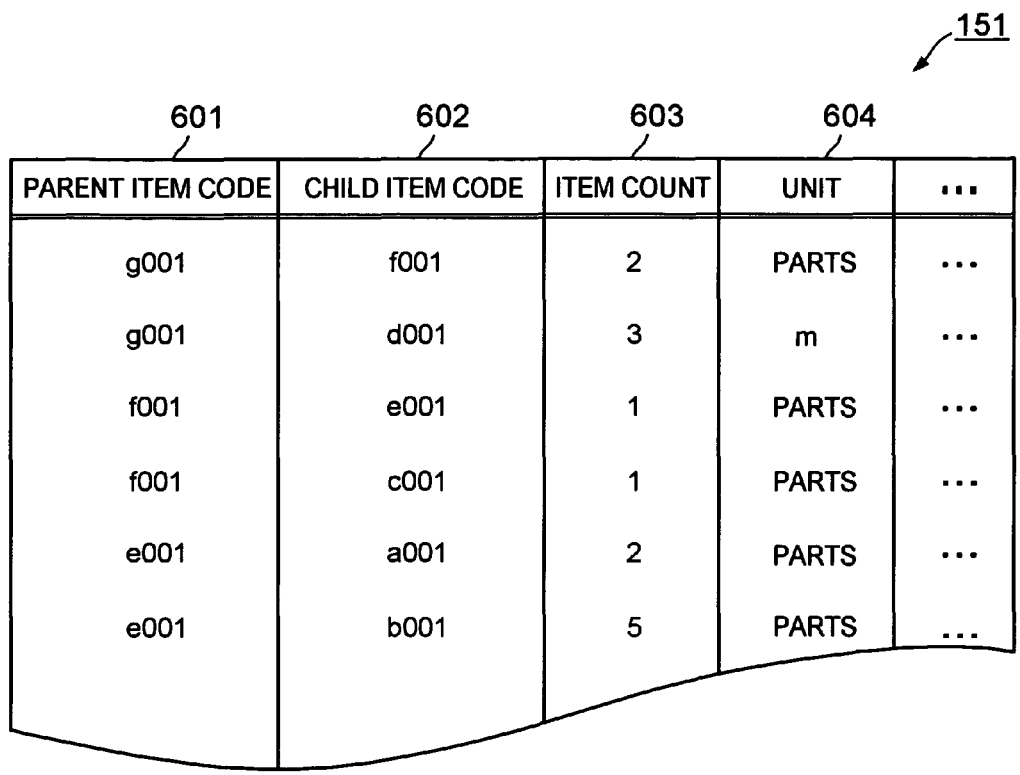
FIG. 6 is a diagram showing one example of an item information table in the embodiment.

As shown in FIG. 6, the item information table 151 has fields such as a parent item code 601, a child item code 602, an item count 603, a unit 604, and the like. The fields (data) in each row (record) are associated with each other.

The parent item code 601 and the child item code 602 are in-office codes of the manufacturer 11, which specify the item and represent a parent-child structure of each item. Namely, the child item code 602 is a child item of the associated parent item code 601. The item count 603 is an item count of the item of the associated child item code 602, which is incorporated into the associated parent item code 601. The unit 604 is a unit of the associated item count 603. Specifically, for instance, FIG. 6 illustrates an example in which the parent item code 601 "g001" is configured by having the child item code 602 "f001" of which the item count 603 "2" and the unit 604 "parts" are given by "2 parts" and having the child item code 602 "d001" of which the item count 603 "3" and the unit 604 "m" are given by "3 m". Further, the parent item code 601 "f001" is configured by having the child item code 602 "e001" of which the item count 603 "1" and the unit 604 "part" are given by "1 part" and having the child item code 602 "c001" of which the item count 603 "1" and the unit 604 "part" are given by "1 part".

Incidentally, it is herein assumed that one item information table 151 is generated per product. Accordingly, FIG. 6 illustrates only the example of one item information table 151; however, if there is a plurality of types of products to which the system according to this embodiment is applied, the item information tables 151 for the respective products may be generated.

Next, one example of the item master information table 152 will be explained with reference to FIG. 7.

As shown in FIG. 7, the item master information table 152 has fields such as an item code 701, a supplier code 702, a supplier item number 703, and the like. The fields (data) in each row (record) are associated with each other.

The item code 701 is an in-office code of the manufacturer 11, which specifies the item. The supplier code 702 serves to identify the supplier that supplies the item specified by the associated item code 701. The supplier item number 703 is an in-office code which specifies the item of the associated item code 701 in the office of the supplier identified by the associated supplier code 702.

Herein, it is considered that the item code 701 involves, though is not particularly limited, to, cases of using, for example, a drawing number. In cases of using the drawing number as the item code 701, it is feasible to select the item of which supply cost and delivery lead time are optimal in a way that registers a plurality of suppliers for one item on the drawing.

Specifically, for example, FIG. 7 shows a case in which the item code 701 "a001" includes two usable items, which are the item specified by the supplier item number 703 "aaa-11" supplied by the supplier of the supplier code 702 "aaa-1" and the item specified by the supplier item number 703 "aaa-22" supplied by the supplier of the supplier code 702 "aaa-2".

Note that the item information table 151 and the item master information table 152 are associated with each other by the item codes. The item master information table 152 is registered with the information on all the items registered in the item information table 151.

Further, it is assumed that the item information table 151 and the item master information table 152 are previously generated and stored in the storage device of the design information management device 124.

Next, one example of the production instruction information table 361 will be described with reference to FIG. 8.

In FIG. 8, the production instruction information table 361 has fields such as a production instruction number 801, an item code 802, a product production instruction count 803, a lot number 804, and the like. The production instruction number 801, the item code 802, the product production instruction count 803, the lot number 804, and the like, are associated with each other. The production instruction number 801 is a production instruction code. The item code 802 is a code of the product whose production is designated. The product production instruction count 803 is a quantity of the production of the product specified by the associated item code 802. The lot number 804 is a lot number allocated to the product in the case of producing the product of the associated item code 802. Further, the production instruction information table 361 has fields such as a production process 811, an instruction count 812, an item code 813, a required quantity 814, a unit 815, and the like. Rows of the production process 811, the instruction count 812, the item code 813, the required quantity 814, the unit 815, and the like are arranged in sequence according to the production process, and the fields (data) of each row are associated with each other.

The production process 811 is a process for producing the product. The instruction count 812 is a quantity of the item produced in the associated production process 811. The item code 813 is a code of the item used in the associated production process 811. Moreover, the required quantity 814 and the unit 815 in combination represent a quantity of the item specified by the associated item code 813, which is required for producing the item by the quantity designated in the product production instruction count 803.

The instruction count 812 and the required quantity 814 are calculated in a way that multiples the product production instruction count 803 by the item count 603 in the item information table 151. In the actual results information table 161, the item code 813 and the unit 815 are the information transcribed from the item information table 151 and the item master information table 152. Thus, the information in the item information table 151 and the item master information table 152 are transferred to the actual results information table 161. An example of these operations will be explained later.

Herein, the production process of the product "g001" shown in FIGS. 6 and 7 will be described with reference to FIG. 9.

Figure 9:
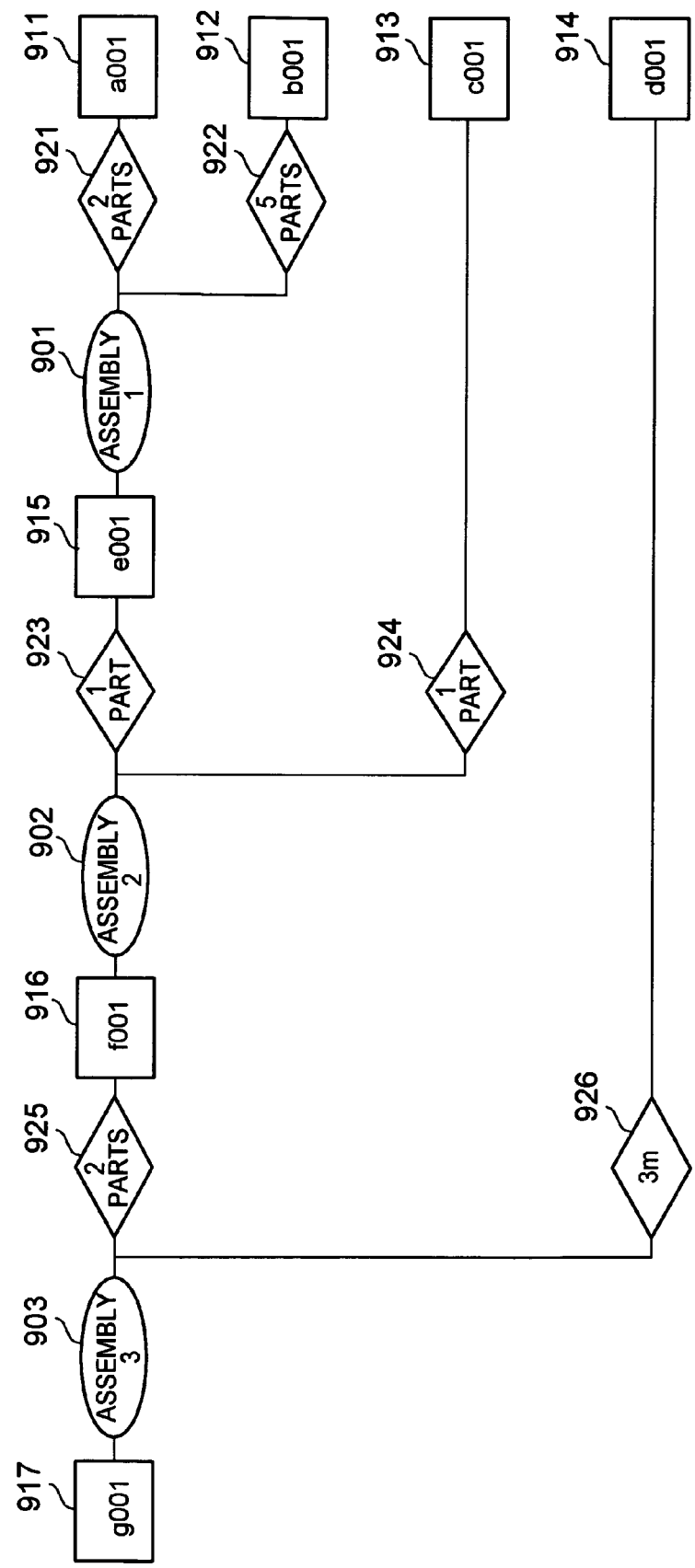
FIG. 9 is an explanatory diagram showing a production process of a product in the embodiment.

In FIG. 9, processes 901 through 903 are indicated by a circular shape. FIG. 9 illustrates that the production proceeds from right to left. An item 911 through an item 917 of the members, the components, and the intermediate products, which are put in the respective processes, are circumscribed by squares (□). A quantity 921 through a quantity 926 of the members, the components, and the intermediate products, which are put in the respective processes, are circumscribed by rhomboids (◇).

Specifically, for instance, FIG. 9 shows an example in which the item 915 "e001" is produced by use of the item 911 "a001" with the quantity 921 "2 parts" and the item 912 "b001" with the quantity 922 "5 parts" in the process 901 "assembly 1". Further, it is also shown that the item 916 "f001" is produced by use of the item 915 "e001" with the quantity 923 "1 part" and the item 913 "c001" with the quantity 924 "1 part" in the process 902 "assembly 2". The item 917 "g001" defined as the product is produced by use of the item 916 "f001" with the quantity 925 "2 parts" and the item 914 "d001" with the quantity 926 "3 m" in the process 903 "assembly 3".

Incidentally, FIG. 8 shows the production instruction information in the case of producing 10 parts of the product "g001" illustrated in FIGS. 6 and 7 according to the production processes shown in FIG. 9. For example, the product count of the product produced in the final process "assembly 3" is "10 parts", and hence "10" is given in the product production instruction count 812. Further, the production of "1 part" of the item "g001" requires "2 parts" of the item "f001" and "3 m" of the item "d001" in FIG. 9, and therefore the required quantities of "f001" and "d001" in "assembly 3" are "20 parts" and "30 m", which are quantities needed for producing "10 parts" of "g001".

Next, one example of the actual results information table 161 will be explained with reference to FIG. 10.

In FIG. 10, the actual results information table 161 has fields such as a production instruction number 1001, an item code 1002, a product production instruction count 1003, a lot number 1004, and the like. The production instruction number 1001, the item code 1002, the product production instruction count 1003, the lot number 1004, and the like are associated with each other.

The production instruction number 1001 is a production instruction code. The item code 1002 is a code of the product of which the production is instructed. The product production instruction count 1003 is a quantity of the production of the product specified by the associated item code 1002. The lot number 1004 is a lot number allocated to the product in the case of producing the product of the associated item code 1002.

The actual results information table 161 further has fields such as a production process 1011, an item code 1012, a supplier code 1013, a supplier item number 1014, a lot number 1015, and the like. Rows of the production process 1011, the item code 1012, the supplier code 1013, the supplier item number 1014, the lot number 1015, and the like, are arranged in sequence according to the production process, and the fields (data) of each row are associated with each other.

The production process 1011 is a process needed for producing the product. The item code 1012 specifies an item required for the associated production process 1011. The supplier code 1013 is a code of the supplier 12 that supplies the item of the associated item code 1012. The supplier item number 1014 is an in-office code of the supplier 12 that supplies the item of the associated item code 1012. The lot number 1015 is a lot number of the item used for the product to be produced in the items of the associated item code 1012.

Note that in FIG. 10, the items with a mark "-" entered in the supplier code 1013 and the supplier item number 1014 represent components or intermediate products, which are produced by the manufacturer 11 by being manufactured or composed in the associated production process 1011.

Specifically, for instance, FIG. 10 shows the actual results information of the product having the item code 1002 "g001" and the lot number 1004 "g-123".

For example, it is shown that the production process 1011 "assembly 3" uses an item having the item code 1012 "d001", the supplier code 1013 "ddd", and the supplier item number 1014 "ddd-1" and the item (intermediate product) having the item code 1012 "f001".

Further, for instance, the production process 1011 "assembly 1" uses an item having the item code 1012 "a001", the supplier code 1013 "aaa-1", the supplier item number 1014 "aaa-11", and the lot number 1015 "a-123" and an item having the item code 1012 "b001", the supplier code 1013 "bbb-1", the supplier item number 1014 "bbb-11", and the lot number 1015 "b-123".

Incidentally, there may be cases of having a plurality of supplier item numbers associated with the in-office item code of the manufacturer 11 in the item master information table 152. This is because, as described above, the item master information table 152 contains all the information on available candidate items for producing the product. On the other hand, the actual results information table 161 contains information on the items actually employed for producing the product, and hence there are often cases of having the single supplier item number associated with the in-office item code of the manufacturer 11.

Moreover, the item code 1012, the supplier code 1013, and the supplier item number 1014 are the information transcribed from the actual results information table 161 and the item master information table 152. With this scheme, in addition to the information in the item information table 151, the information in the item master information table 152 is registered in the actual results information table 161.

Next, one example of the actual results configuration information table 162 will be described with reference to FIG. 11.

Figure 11:
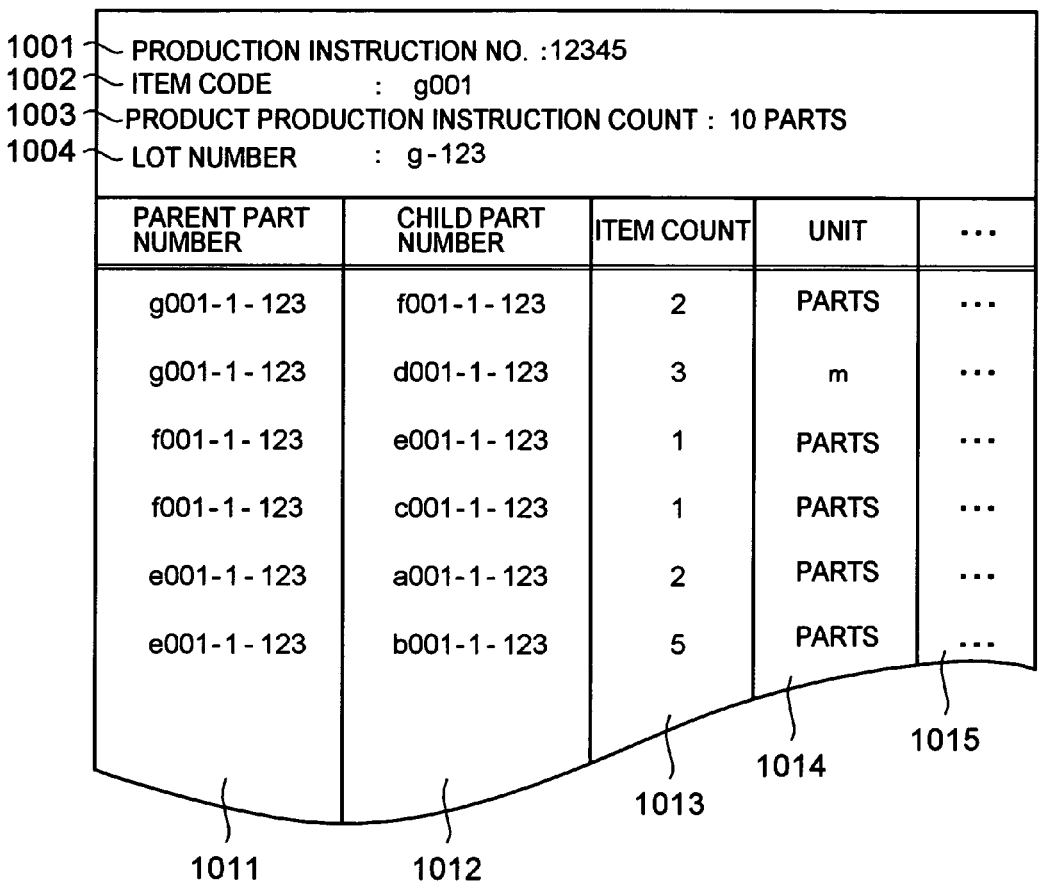
FIG. 11 is a diagram showing one example of the actual results configuration information table in the embodiment.

As illustrated in FIG. 11, the actual results configuration information table 162 has fields such as a production instruction number 1101, an item code 1102, a product production instruction count 1103, a lot number 1104, and the like. The production instruction number 1101, the item code 1102, the product production instruction count 1103, the lot number 1104, and the like, are associated with each other.

The production instruction number 1101 is a production instruction code. The item code 1102 is a code of the product whose production is instructed. The product production instruction count 1103 is a quantity of production of the product specified by the associated item code 1102. The lot number 1104 is a lot number allocated to the product in the case of producing the product of the associated item code 1102.

The actual results configuration information table 162 further has fields such as a parent part number 1111, a child part number 1112, an item count 1113, a unit 1114, and the like. The part number is defined as a unique in-office code issued to each of the items, such as the products, the intermediate products, the components, and the members. The child part number 1112 is a part number of the item, which is incorporated into the item specified by the associated parent part number 1111. The item count 1113 and the unit 1114 in combination represent a quantity of the associated child part number 1112 incorporated into the associated parent part number 1111.

Note that the unit 1114 is information transcribed from the actual results information table 161. The information in the item information table 151 is thereby registered in the actual results configuration information table 162.

Next, one example of the actual results item information table 163 will be explained with reference to FIG. 12.

In FIG. 12, the actual results item information table 163 has fields such as production instruction number 1201, item code 1202, product production instruction count 1203, lot number 1204, and the like. The production instruction number 1201, the item code 1202, the product production instruction count 1203, the lot number 1204, and the like, are associated with each other.

The production instruction number 1201 is a production instruction code. The item code 1202 is a code of the product whose production is instructed. The product production instruction count 1203 is a quantity of the production of the product specified by the associated item code 1202. The lot number 1204 is a lot number allocated to a product in the case of producing a product of the associated item code 1202.

The actual results item information table 163 further has fields such as part number 1211, item code 1212, supplier code 1213, supplier item number 1214, lot number 1215, and the like. The fields (data) of each row are associated with each other.

The part number 1211 is a unique in-office code issued to each of the items such as the products, the intermediate products, and the components. The item code 1212 is identifying information of an associated part number 1211. The supplier code 1213 is a code of the supplier that supplies the item of the associated part number 1211. The supplier item number 1214 is an in-office code used by the supplier that supplies the item of the associated part number 1211. A lot number 1215 is a production lot of the item of the associated part number 1211.

Note that in FIG. 12, the items with a mark "-" entered in the supplier code 1213 and the supplier item number 1214 represent the items having the associated part number 1201, which are obtained by the manufacturer 11 in manufacturing or assembling.

Further, the item code 1212, the supplier code 1213, and the supplier item number 1214 are information transcribed from the actual results information table 161 and the item master information table 152. The information in the item master information table 152 is thereby registered in the actual results item information table 163.

Herein, specific examples of FIGS. 11 and 12 will be explained.

FIG. 11 illustrates that the item (the intermediate product) having parent part numbers 1111 "e001-1-123" is constructed of "2 parts" of the item specified by the child part number 1112 "a001-1-123" having the item count 1113 and the unit 1114 and "5 parts" of the item specified by the child part number 1112 "b001-1-123" having the item count 1113 and the unit 1114.

Further, FIG. 12 shows that the item of the part number 1211 "a001-1-123" uses the item having a supplier code 1213 "aaa-1", a supplier item number 1214 "aaa-11" and a lot number 1215 "a-123".

Thus, there are cases of having the plurality of supplier item numbers associated with the in-office item code used by the manufacturer 11 in the item master information table 152; however, only the information of the actually-employed items is contained in the actual results item information table 163.

It is to be noted that the actual results information table 161, the actual results configuration information table 162, and the actual results item information table 163 are generated based on an operational example, which will be described later, for each production lot per product. Accordingly, the drawings illustrate only the examples of the actual results information table 161, the actual results configuration information table 162, and the actual results item information table 163 on a single basis; however, a plurality of tables in each category is generated in the case of producing a plurality of types of products and producing the same type of product with a plurality of lots.

Next, one example of the correction information table 171 will be described with reference to FIG. 13.

In FIG. 13, the correction information table 171 has fields such as an item code 1301, a supplier code 1302, a supplier item number 1303, a registration unit 1304, a unit 1305, a correction coefficient 1306, and the like. The fields of each row are associated with each other.

The item code 1301 is a code of the item. The supplier code 1302 is a code of the supplier 12 that supplies the item specified by the associated item code 1301. The supplier item number 1303 is a code of the item specified by the associated item code 1301 at the supplier 12 of the associated supplier code 1302. The registration unit 1304 is a unit of the environmental load that is registered in the chemical substance information table 181 with respect to the item of the associated item code 1301. The unit 1305 is a unit of usage in the case of using the item of the associated item code 1301 for producing the product. The correction coefficient 1306 is a coefficient by which the associated unit 1305 is integrated in order to attain the associated registration unit 1304. Namely, the correction coefficient 1306 is information used for correcting a discrepancy between the unit 604 related to the usage of the item described in the item information table 151 and the registration unit 506 related to the usage of the item described in the chemical substance information table 181. Specifically, for instance, with respect to a linear element of "500 m" per "1 part", "m" is registered as the unit in the item information table 151 shown by way of one example in FIG. 6, while "part" is registered as the registration unit of the chemical substance information in the chemical substance information table 181 shown by way of one example in FIG. 5. In this case, the correction coefficient 1306 in the correction information table 171 shown by way of one example in FIG. 13 is set to "0.002" obtained by taking a ratio of "1 part" to "500 m".

Further, the discrepancy between the units is detected when referring to the item information table 151, the item master information table 152, and the chemical substance information table 181. The correction coefficient 1306 in the correction information table 171 can be specified by use of the information enabling the respective items to be associated with each other in each table. Namely, in the examples shown in FIGS. 5, 6, and 7, the item information table 151 and the item master information table 152 are associated with each other via the item codes, and the item master information table 152 and the chemical substance information are associated with each other via the supplier codes and the supplier item numbers. The correction coefficient 1306 in the correction information table 171 is associated with the item code 1301, the supplier code 1302, and the supplier item number 1303, thereby enabling the correction coefficient 1306 generated in the evaluation at a design stage to be used also in the evaluation of the chemical substance after producing the product.

Next, one example of the correction master information table 172 will be explained with reference to FIG. 14.

In FIG. 14, the correction master information table 172 has fields such as a unit 1401, a registration unit 1402, a correction coefficient 1403, and the like. The fields (data) of each row are associated with each other.

The registration unit 1402 is a unit of the environmental load that is registered in the chemical substance information table 181. The correction coefficient 1403 is a coefficient by which the associated unit 1401 is integrated in order to attain the associated registration unit 1402. Specifically, for example, FIG. 14 shows a case where when the unit 1401 is "g" and the registration unit 1402 is "kg", the correction coefficient 1403 is set to "0.001" obtained by taking a ratio of "g" to "kg". Further, if the registration unit 1402 is the same as the unit 1401, the correction coefficient 1403 is set to "1".

Note that the correction master information table 172 is employed in the case of converting the general units. By contrast, the correction information table 171 serves to set the correction coefficient per item.

Moreover, herein, an assumption is that the correction master information table 172 is registered beforehand in the correction information management device 126; however, the information may be registered in, added to, and deleted from the table.

Next, one example of the evaluation information table 461 will be described with reference to FIG. 15.

The table 461 has fields such as a production instruction number 1501, an item code 1502, an item name 1503, a lot number 1504, and the like.

The production instruction number 1501 is a production instruction code. The item code 1502 is a code of the product of which the production is instructed. The item name 1503 is a name of the produced product. The lot number 1504 is a production lot of the produced product.

The evaluation information table 461 further includes a chemical substance code 1511, content 1512, a result 1513, and the like. The chemical substance code 1511, the content 1512, the result 1513, and the like of each row are associated with each other.

The chemical substance code 1511 is a code of the chemical substance contained in the produced product. The content 1512 is content of the chemical substance specified by the associated chemical substance code 1511. The result 1513 shows whether the associated content 1512 satisfies a predetermined prescribed value or not.

The evaluation information table 461 is generated based on an operational example that will be described later.

Next, the operational example will be described.

To start with, an outline of the operation in this embodiment will be explained with reference to FIG. 16.

Figure 16:
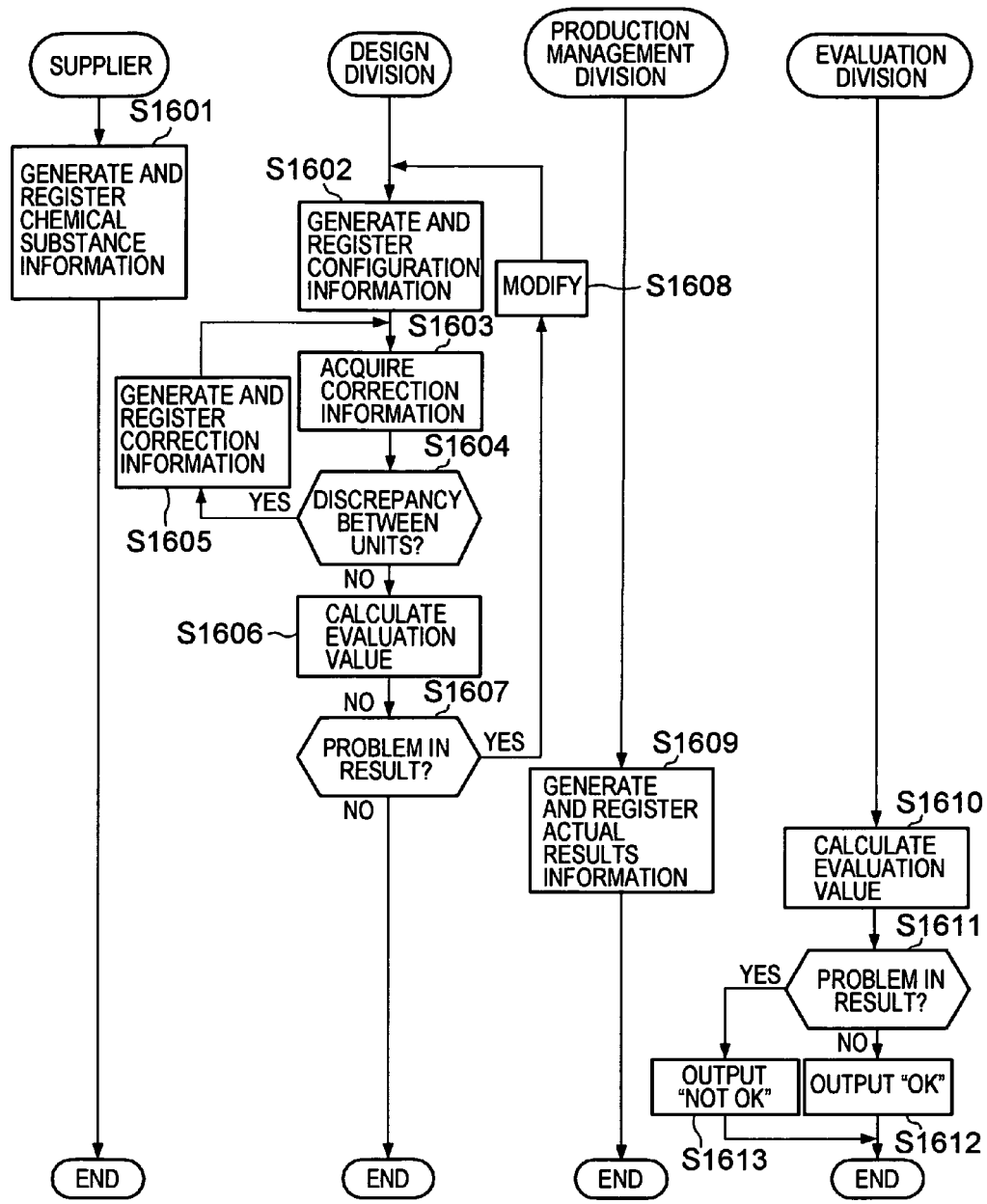
FIG. 16 is an explanatory diagram showing an outline of an operational example in the embodiment.

In FIG. 16, when receiving the instruction from the manufacturer and when delivering the item, an employee of each supplier 12 inputs the supplier code, the supplier item number, the lot number, the substance code, the content, the registration unit, and the like of the item to be delivered, by use of the input device (not shown) of the supplier terminal 131. The supplier terminal 131 registers the inputted information in the chemical substance information table 181 of the chemical substance information management apparatus 112 (S1601).

Further, a designer at the design division of the manufacturer 11 inputs the information on the configuration of the product to be produced, by use of the input device 204 of the design terminal 121. The item information generating unit 251 of the design terminal 121 generates the item information table 151 and the item master information table 152 from the inputted information. The item information registering unit 252 registers the thus-generated item information table 151 and item master information table 152 in the design information management device 124 (S1602).

Next, the designer indicates the item code of an evaluation target product by employing the input device 204 of the design terminal 121. The evaluation unit 253 of the design terminal 121 reads the item information table 151 and the item master information table 152 of the product having the indicated item code from the design information management device 124. Moreover, the evaluation unit 253 of the design terminal 121 reads the chemical substance information on the respective items described in the read item information table 151 and item master information table 152 from the chemical substance information table 181 in the storage device of the chemical substance information management apparatus 112. The evaluation unit 253 of the design terminal 121 reads the correction information table 171 and the correction master information table 172 in advance, from the correction information management device 126 (S1603).

The evaluation unit 253 of the design terminal 121 determines, based on the item information table 151, the item master information table 152, the chemical substance information table 181, and the correction information table 171, whether or not the registration unit of the chemical substance of each of the items that make up the set product matches the unit of usage of the item, and determines whether or not the correction information of each of the items is registered in the correction information table 171 and the correction master information table 172 (S1604).

As a result of the determination in S1604, if there is a discrepancy between the units and if the correction information of the item concerned is registered in neither the correction information table 171 nor the correction master information table 172, the correction information generating unit 255 of the design terminal 121 outputs information which instructs the registration of the correction coefficient, to the output device 205 and the like. The designer instructs a correction coefficient registering process by use of the input device 204 of the design terminal 121. The correction information registering unit 256 of the design terminal 121 adds a postscript of the inputted correction coefficient to the correction information table 171 and the correction master information table 172, and further registers the updated correction information table 171, the updated correction master information table 172, and the like, in the correction information management device 126 (S1605).

As a result of the determination in S1604, in cases where there is no discrepancy between the units and where the chemical substance information of the item with the discrepancy between the units is registered in at least one of the correction information table 171 and the correction master information table 172, the evaluation unit 253 of the design terminal 121 calculates an evaluation value of the chemical substance contained in the evaluation target product by employing each piece of information read in S1603 (S1606). The design terminal 121 determines whether or not an evaluation result based on the calculated evaluation value is rejected because the evaluation result does not satisfy a predetermined threshold value, and the like (S1607).

As a result of the determination in S1607, if the evaluation result is rejected, the evaluation result output unit 254 outputs the information showing the rejection to the output device 205. The designer checks the evaluation result of the chemical substance, and, if a problem exists in the evaluation result, executes a process corresponding to content of the problem. A concrete scheme is to consider application of other items and to examine a change in content of the chemical substance and the like. The designer instructs changes in the item information table 151, the item master information table 152, and the like by employing the input device 204 of the design terminal 121. The item information generating unit 251 of the design terminal 121 changes, based on this instruction, the item information table 151 and the item master information table 152. The item information registering unit 252 updates the item information table 151 and the item master information table 152 of the actual results information management device 125 (S1608). After this process, the processes in S1601 and S1602 onward are re-executed.

As a result of the determination in S1607, if the evaluation result is accepted, the generated item information table 151 and item master information table 152 are set as usable at a production management division.

A production division produces the product based on a production plan. At this time, the employee at the production management division instructs the generation of the actual results information table 161, the actual results configuration information table 162, the actual results item information table 163, and the like by using the input device 304 of the production management terminal 122. The production instruction input reception unit 351 and the production record input reception unit 353 of the production management terminal 122 generates, based on the instruction, the actual results information table 161, the actual results configuration information table 162, and the actual results item information table 163 from the item information table 151, the item master information table 152, and the like. The production instruction registering unit 352 and the production record registering unit 354 register the actual results information table 161, the actual results configuration information table 162, and the actual results item information table 163 in the actual results information management device 125 (S1609).

At the evaluation division, the item information acquisition unit 451 of the evaluation terminal 123 acquires the information on the configuration of the evaluation target product from the information within the actual results configuration information table 162 and the actual results item information table 163. Next, the chemical substance information acquisition unit 452 acquires the chemical substance information of each of the items that make up the evaluation target product out of the chemical substance information table 181. The correcting unit 453 compares the registration unit of the chemical substance of each of the items that make up the set product with the unit of the usage of the item, and makes the correction as needed. The calculation unit 454 calculates the evaluation value per chemical substance of the evaluation target product (S1610).

The output device 456 of the evaluation terminal 123 determines whether or not the evaluation result based on the calculated evaluation value is rejected because the evaluation result is not equal to or lower than the threshold value, and so forth (S1611).

As a result of the determination in S1611, if the evaluation result is accepted, the output unit 456 outputs information notifying the acceptance to the output device 405 and the like. (S1612).

As a result of the determination in S1611, if the evaluation result is rejected, the output unit 456 outputs information notifying the rejection to the output device 405 and the like (S1613). A quality assurance division or the like dispatches the produced product if the outputted information is acceptable, and stops the delivery of the produced product if the output information is rejected.

Next, the operational example given above will be described in detail.

Figure 17:
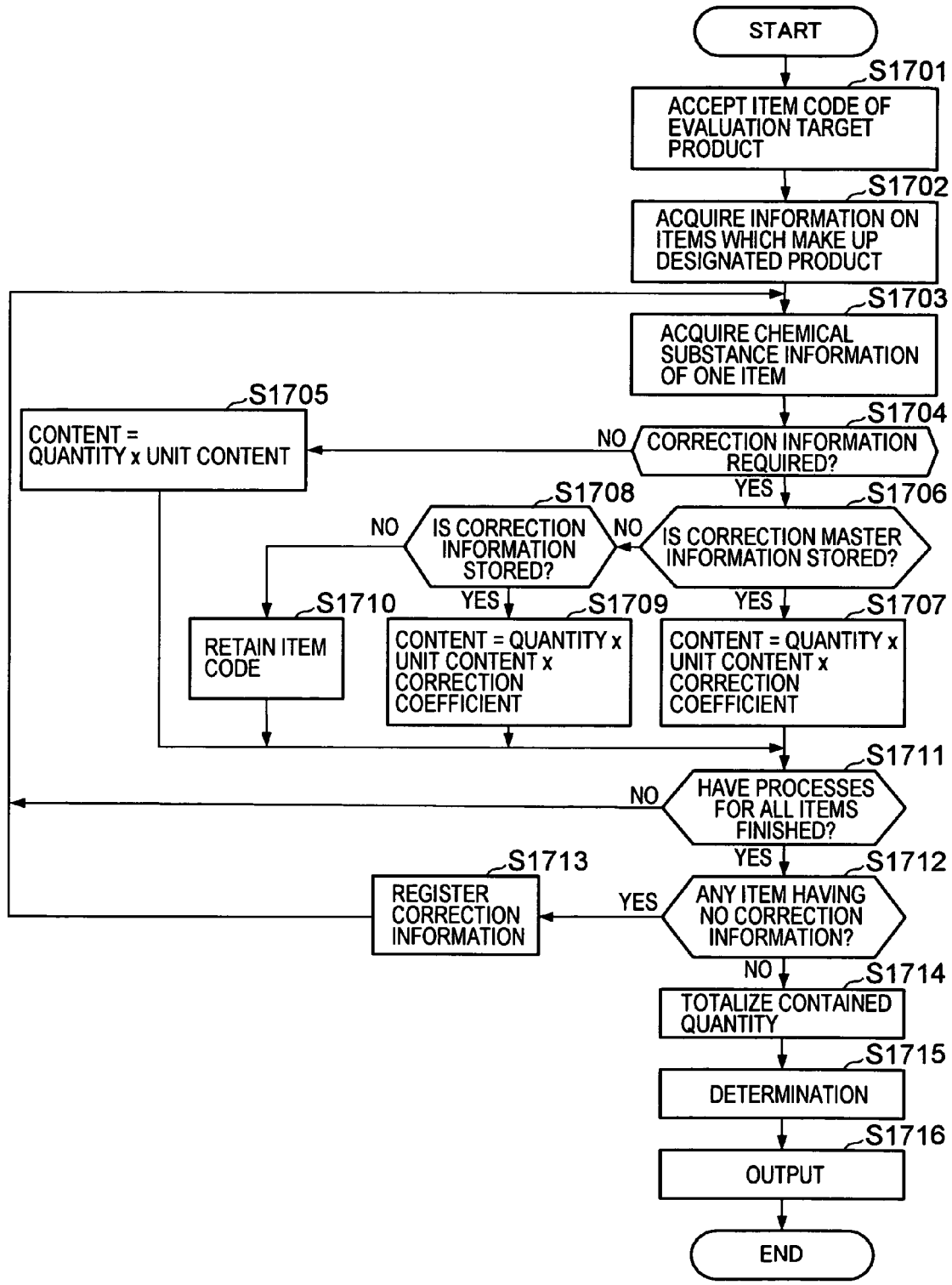
FIG. 17 is a diagram showing an operational example of calculating content of a chemical substance at the design stage in the embodiment.

First, the processes in S1603 to S1606 in FIG. 16 will be explained with reference to FIG. 17.

To begin with, the operator or the like at the design division inputs the item code of the evaluation target product by employing the input device 204 of the design terminal 121. The evaluation unit 253 of the design terminal 121 accepts the inputted item code (S1701).

Next, the evaluation unit 253 acquires, from the design information management device 124, the item information table 151 and the item master information table 152 of the product having the inputted item code (S1702). Specifically, for instance, the evaluation unit 253 reads, from the design information management device 124, the item information table 151 and the item master information table 152, which show the configuration of the evaluation target product accepted in S1701. The evaluation unit 253 of the design terminal 121 stores the read item information table 151 and item master information table 152 in the secondary storage device 203.

Next, the evaluation unit 253 selects one of the items from which the evaluation target product is composed, and acquires the chemical substance information of the selected item and the quantity of the item that is needed for producing the single evaluation target product (S1703).

For that purpose, the evaluation unit 253 acquires, for example, first, the item codes of the items down to the lowermost layer and the quantities of the respective items that are required for producing one evaluation target product. In order to acquire the quantities of the respective items that are necessary for producing one evaluation target product, the evaluation unit 253 obtains, for instance, a product of a quantity of the parent item of the acquisition target items needed for producing the single evaluation target product and an item count of each of the acquisition target items. Herein, the quantity of the parent item of the item, the parent item being the product itself, is "1".

Specifically, the evaluation unit 253, for example, at the first onset, refers to the respective rows of the item information table 151, then selects the row of the parent item code 601 matching the item code of the evaluation target product accepted in S1701, and reads the child item code 602, the item count 603, the unit 604, and the like of the selected row. For explanatory purposes, the child item code 602 and the item count 603, which are read herein, will hereinafter be referred to as a first item code and an item count of the first item. Next, the evaluation unit 253 searches for the rows each containing the parent item code 601 matching the first item code by referring to other rows, and reads the child item code 602, the item count 603, the unit 604, and the like of the relevant row. For explanatory purposes, the child item code 602 and the item count 603, which are read herein, will hereinafter be referred to as a second item code and an item count of the second item. Herein, the evaluation unit 253 calculates a product of the quantity of the first item needed for producing the single evaluation target product and the item count of the second item. It is to be noted that the first item is herein the product to be produced, and hence an equation is given by "the quantity of the first items needed for producing one evaluation target product=1". This product is the quantity of the second item needed for producing one evaluation target product. Further, the evaluation unit 253 searches for the rows each containing the parent item code 601 matching the second item code by referring to other rows, and reads the child item code 602, the item count 603, the unit 604, and the like of the relevant row. For explanatory purposes, the child item code 602 and the item count 603, which are read herein, will hereinafter be referred to as a third item code and an item count of the third item. Herein, the evaluation unit 253 calculates a product of the quantity of the second item needed for producing the single evaluation target product and the item count of the third item. This product is the quantity of the third item needed for producing one evaluation target product. The evaluation unit 253 repeats this process till the child item code 602 of the relevant row becomes "-", thereby acquiring the item codes of the items down to the lowermost layer and the quantity of each of the items needed for producing one evaluation target product.

Next, the evaluation unit 253 selects one of the items of which the evaluation target product is composed, and acquires the chemical substance information of the selected item. Note that a selecting sequence of the items of which the evaluation target product is composed may be set arbitrarily; however, the items are to be selected in a sequence from the lowermost layer. Therefore, the evaluation unit 253 refers to, for example, the item master information table 152 and thus reads a combination of the supplier code 702, the supplier item number 703, and the like, of the row containing the item code 701 matching the item code of the item of the lowermost layer.

Subsequently, the evaluation unit 253 selects, from the chemical substance information table 181 of the chemical substance information management apparatus 112, the row containing the supplier code 501 and the supplier item number 502 matching each combination of the supplier code 702, the supplier item number 703, and the like, which are read in the process described above. Then, the evaluation unit 253 reads the lot number 503, the substance code 504, the content 505, the registration unit 506, and the like, of the selected row. The evaluation unit 253 of the design terminal 121 stores, in the memory 202 and the like, the acquired information together with the item code, the supplier code, the supplier item number, the unit, and the like, which are acquired in the process of S1702.

Next, the evaluation unit 253 determines whether the correction information of the item, of which the chemical substance information is acquired in the process of S1703, is required or not (S1704).

For that purpose, the evaluation unit 253 refers to, for example, a combination of the item code, the supplier code, the supplier item number, the unit, the lot number, the substance code, the content, the registration unit, and the like, that are read from the chemical substance information management apparatus 112 in the process in S1703, and determines whether the unit contained in this combination matches the registration unit or not. As a result of this determination as to whether they match, it can be determined that the item of which the chemical substance information is acquired in the process in S1703, has a discrepancy between the unit used in the production process and the registration unit of the chemical substance information registered by the supplier, i.e., it can be determined that correction information is required.

As a result of the determination in S1704, if the correction information is not needed, the evaluation unit 253 calculates content of the chemical substance of the item selected in the process in S1703 (S1705). Therefore, for example, the evaluation unit 253 calculates the content in the following equation with respect to each of the chemical substances contained in the item selected in the process in S1703.

Content=Quality×Unit Content (Equation 1)

Herein, the quantity is a quantity of the item included in one evaluation target product and selected in the process in S1703. This quantity is the quantity of the item acquired in the process in S1703 and required for producing one evaluation target product. Further, the unit content is content of the chemical substance registered by the supplier 12. Specifically, for example, the unit content is the content 505 per substance code 504, which is acquired from the chemical substance information table 181 in the process in S1703.

As a result of the determination in S1704, if the correction information is required, the evaluation unit 253 determines whether or not the correction information of the item selected in the process in S1703 is stored in the correction master information table 172 (S1706). The evaluation unit 253 therefore refers to, for example, the unit 1401 and the registration unit 1402 of each row in the correction master information table 172, and thus determines whether the unit and the registration unit matching those contained in the combination acquired in the process described above, are stored therein or not. As a result of this determination, if the relevant data is stored therein, the evaluation unit 253 determines that a correction coefficient 1403 of the row in the correction master information table 172 is the correction information of this unit, and extracts this correction coefficient 1403.

As a result of the determination in S1707, if the correction information is stored in the correction master information table 172, the evaluation unit 253 calculates content of the chemical substance of the item selected in the process in S1703 (S1708). Therefore, for example, the evaluation unit 253 calculates the content in the following equation with respect to each of the chemical substances contained in the item selected in the process in S1703.

Content=Quantity×Unit Content×Correction coefficient (Equation 2)

Herein, the quantity is a quantity of the item included in one product and selected in the process in S1703. This quantity is the quantity of the item acquired in the process in S1703 and required for producing one evaluation target product. Further, the unit content is content of the chemical substance registered by the supplier 12. Specifically, for example, the unit content is the content 505 per substance code 504, which is acquired from the chemical substance information table 181 in the process in S1703. Further, the correction coefficient is the correction coefficient 1403 extracted in the process in S1706.

On the other hand, as a result of the determination in S1706, if the correction information is not stored in the correction master information table 172, the evaluation unit 253 determines whether or not the correction information of the item selected in the process in S1703 is stored in the correction information table 171 (S1708). For attaining this, the evaluation unit 253 refers to, for example, the respective rows in the correction master information table 172, and thus determines whether or not any row contains the item code 1301 matching the item, of which the chemical substance information is acquired in the process in S1703. As a result of this determination, if the relevant information is contained therein, the evaluation unit 253 determines that the correction information 1306 of the row in the correction information table 171 is the correction information of this unit, and extracts the correction information 1306 thereof.

As a result of the determination in S1708, if the correction information is stored in the correction information table 171, the evaluation unit 253 calculates content of the chemical substance of the item selected in the process in S1703 (S1709). Therefore, for example, the evaluation unit 253 calculates the content in the following equation with respect to each of the chemical substances contained in the item selected in the process in S1703.

Content=Quality×Unit Content×Correction coefficient (Equation 3)

Herein, the quantity is a quantity of the item included in one product and selected in the process in S1703. This quantity is the quantity of the item acquired in the process in S1703 and required for producing one evaluation target product. Further, the unit content is content of the chemical substance registered by the supplier 12. Specifically, for example, the unit content is the content 505 per substance code 504, which is acquired from the chemical substance information table 181 in the process in S1703. Further, the correction coefficient is the correction coefficient 1306 extracted in the process in S1709.

As a result of the determination in S1708, if the correction information is not stored in the correction information table 171, the evaluation unit 253 stores the item code, the supplier code, the supplier item number, the unit, the registration unit, and the like, which are selected in the process in S1703, in a predetermined area of the memory 202 and the like. (S1710).

After the processes in S1705, S1707, S1709 and S1710, the evaluation unit 253 determines whether or not the processes described above are executed for all of the items from which the evaluation target product is composed (S1711).

As a result of the determination in S1711, if there is an item on which the processes described above are not performed, the evaluation unit 253 again executes the processes from S1703 onward as described above on this item.

As a result of the determination in S1711, in cases in which there is no item undergoing none of the processes described above, the evaluation unit 253 refers to the predetermined area of the memory 202 and the like, and thus determines whether or not the item code, the supplier code, the supplier item number, the unit, the registration unit, and the like, are stored in the process in S1710 (S1712).

As a result of the determination in S1712, if the relevant item code, supplier code, supplier item number, unit, registration unit, and the like are stored therein, the correction information generating unit 255 outputs, to the output device 205 and the like, information for accepting input of correction information that is missing, which contains the item code, the supplier code, the supplier item number, and the like. The designer inputs the correction coefficient of the item having the outputted item code, the supplier code, the supplier item number, and the like, by use of the input device 204 and the like. The correction information registering unit 256 stores the accepted correction information in the correction information table 171 of the unit 256 itself, and registers the same correction information in the correction information management device 126 (S1713). Details of this correction information registering process will be described later. After this process, the evaluation unit 253 executes the processes from S1703 onward with respect to the item having the relevant item code.

As a result of the determination in S1712, if the relevant item code, supplier code, supplier item number, unit, registration unit, and the like, are not stored therein, the evaluation unit 253 adds up, for each chemical substance, the contents on an item-by-item basis that are calculated in S1705, S1707 and S1709 (S1714).

Next, the evaluation unit 253 determines whether or not the content added up for each chemical substance satisfies a prescribed value (S1715). To do this, the evaluation unit 253 compares the threshold value predetermined for each chemical substance, with the content added up for each chemical substance, thus determining whether the content is less than the threshold value or not. As a result of this determination, if the content is less than the threshold value, the evaluation unit 253 determines that the content of this chemical substance satisfies the prescribed value.

Note that this threshold value may be a value different for each chemical substance and may also be the same value. Further, the threshold value may be a value different for each evaluation target product and may also be the same value.

The evaluation result output unit 254 outputs the content per chemical substance, which is acquired in S1714, and the result of the determination made in S1715 to the output device 205 (S1716). The designer, if the result of the determination does not satisfy the prescribed value, may take other items into consideration.

Herein, an in-depth description of an operational example of the process in above-mentioned S1713 will be made with reference to FIG. 18.

As a result of the determination in S1712 described above, if the relevant item code, supplier code, supplier item number, unit, registration unit, and the like, are stored therein, the correction information generating unit 255 outputs the information for accepting input of missing correction information to the output device 205 or the like. (S1801). FIG. 19 illustrates one example of a screen that accepts the input of the correction information displayed on the display. FIG. 19 illustrates a screen 1901 that accepts the input of the missing correction information. Shown on the screen 1901 are fields such as an item code 1911, a supplier code 1912, a supplier item number 1913, a unit 1914, a registration unit 1915, a correction coefficient 1916, and the like. The item code 1911, the supplier code 1912, the supplier item number 1913, the unit 1914, the registration unit 1915, the correction coefficient 1916, and the like, of each row are associated with each other. The item code 1911, the supplier code 1912, the supplier item number 1913, the unit 1914, the registration unit 1915, and the like, of each row are defined as a combination of pieces of information stored in the predetermined area of the memory 202 in the process in S1710 described above. The correction coefficient 1916 is the field in which the correction coefficient of the item specified by the associated item code 1911, supplier code 1912, supplier item number 1913, and the like is inputted by the employee in a way that uses the input device 204 and the like.

The employee, after inputting the correction coefficient, presses a button 1921, at which time a combination of values inputted to the fields such as the item code 1911, the supplier code 1912, the supplier item number 1913, the unit 1914, the registration unit 1915, and the correction coefficient 1916, which are displayed, are inputted to the design terminal 121.

Figures 18, 19:
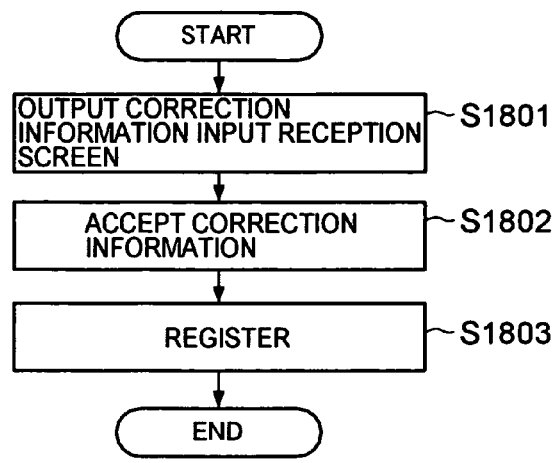
FIG. 18 is a diagram showing an operational example of registering correction information in the embodiment.
FIG. 19 is a diagram showing an example of a screen for registering the correction information in the embodiment.

In FIG. 18, when accepting the missing piece of correction information inputted by the employee in a way that uses the input device (S1802), the correction information registering unit 256 registers this information in the correction information table 171 of the correction information management device 126 (S1803). Specifically, for instance, the correction information registering unit 256 additionally registers the thus-inputted item code 1911, supplier code 1912, supplier item number 1913, unit 1914, registration unit 1915, and correction coefficient 1916 as the item code 1301, the supplier code 1302, the supplier item number 1303, the registration unit 1304, the unit 1305, the correction coefficient 1306, in the correction information table 171.

Thus, it is sufficient in the evaluation at the design stage to register the correction information with respect to one item table, and hence the correction coefficient can be manually registered for a combination of units so as to disable the correction coefficient from being registered beforehand. Furthermore, it is possible to register the correction information and to evaluate the chemical substance continuously, thereby enabling both of the processes to be done through searching for the chemical substance information once and enabling the operating efficiency to be improved.

Next, an operational example of creating a written instruction used for the actual production of the product at the production management division when producing the product, will be explained with reference to FIG. 20.

Figure 20:
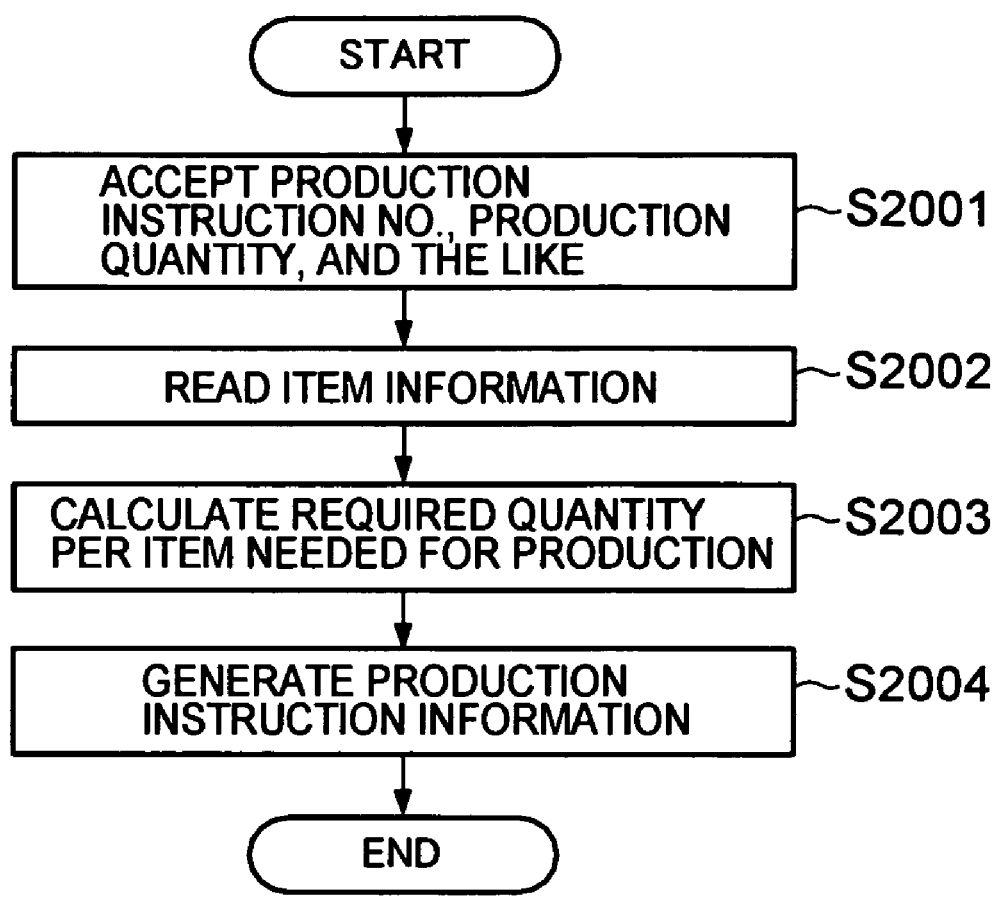
FIG. 20 is a diagram showing an operational example of storing the actual results information at the production stage in the embodiment.

In FIG. 20, the production instruction input reception unit 351 of the production management terminal 122 accepts a production instruction number of the product to be produced, an item code of the product to be produced, a product production instruction count, a lot number of the product to be produced this time, and so on (S2001). These pieces of information are the information inputted by the operator via the input device 304 and the like. Next, the production instruction input reception unit 351 of the production management terminal 122 acquires the item information table 151 and the item master information table 152 from the design information management device 124 (S2002). Specifically, for example, the production instruction input reception unit 351 acquires the item information table 151, the item master information table 152, and the like from the design information management device 124.

Subsequently, the production instruction input reception unit 351 calculates a required quantity of the item in each process for producing the product (S2003), and a production instruction information table 361 is thus organized (S2004).

Next, a specific operation example of S2003 and S2004 will be explained.

To begin with, the production instruction input reception unit 351 acquires the item code, the instruction count, the required quantity and the unit of each of the items that make up the product, which are accepted in S2001. For acquiring the instruction count, the production instruction input reception unit 351 acquires the required quantity of the parent item of an acquisition target item. In this case, the required quantity of the parent item of the item, of which the parent item is the product itself, is the product production instruction count. Further, for acquiring the required quantity, the production instruction input reception unit 351 obtains a product of the required quantity of the parent item of the acquisition target item and the item count of the acquisition target item.

Specifically, for example, the production instruction input reception unit 351 at first refers to the respective rows in the item information table 151, then selects the row of the parent item code 601 matching the product item code accepted in S2001, and reads the child item code 602, the item count 603, the unit 604, and the like, of the selected row. For explanatory purposes, the child item code 602 and the item count 603, which are read, will hereinafter be referred to as a first item code and an item count of the first item. Next, the production instruction input reception unit 351 searches for the row containing the parent item code 601 matching the first item code by referring to other rows, and reads the child item code 602, the item count 603, the unit 604, and the like, of the relevant row. For explanatory purposes, the child item code 602 and item count 603 thus read, will hereinafter be referred to as a second item code and an item count of the second item. Next, the production instruction input reception unit 351 obtains a required count of the first item. Note that the first item is the product itself to be produced, and hence an equation is written as "the required quantity of the first item=the product production instruction count". This required quantity of the first item is the instruction count of the second item. Moreover, the production instruction input reception unit 351 calculates a product of the required quantity of the first item and the item count of the second item. This product corresponds to the required quantity of the second item. Next, the production instruction input reception unit 351 searches for the row containing the parent item code 601 matching the second item code by referring to other rows, and reads the child item code 602, the item count 603, the unit 604, and the like of the relevant row. For explanatory purposes, the child item code 602 and the item count 603 thus read, will hereinafter be referred to as a third item code and an item count of the third item. Next, the production instruction input reception unit 351 obtains a required quantity of the second item. The required quantity of the second item is the instruction count of the third item. Further, the production instruction input reception unit 351 calculates a product of the required quantity of the second item and the item count of the third item. This product corresponds to the required quantity of the third item. The production instruction input reception unit 351 repeats these processes with respect to all of the items that make up the product till the child item code 602 of the relevant row becomes "-", thereby acquiring the item codes of the items down to the lowermost layer, the instruction count of each item in each process, the required quantity, the unit, and the like, of each of the items needed for producing the number of products corresponding to the product production instruction count accepted in S2001. The production instruction input reception unit 351 stores, in the predetermined area of the memory 302, a combination of the child item code 602, the item count 603, the unit 604, and the like, that are read from the item information table 151, and a combination of the instruction count of the item of this child item code 602, the required quantity, and the like, respectively.

Next, the production instruction input reception unit 351 acquires the processes for producing the product, and the item codes and the like, of the items used in the respective processes. For this acquisition, for example, the secondary storage device 303 and the like may be stored in advance with a table (not shown) in which the processes for producing each product are associated with the item codes and the like, of the items used in the processes. Further, the processes for producing the product, and the item codes of the items used in the respective processes may also be inputted from the input device 304.

Next, the production instruction input reception unit 351 generates the production instruction information table 361 from the information acquired in the processes described above. Specifically, for instance, the production instruction input reception unit 351 stores a production instruction number of the product to be produced, an item code of the product to be produced, a product production instruction count, a lot number of the product to be produced this time, and so on, which are accepted in the process in S2001, as a production instruction number 801, an item code 802, a product production instruction count 803, a lot number 804 of the product to be produced this time, and the like in the production instruction information table 361. Moreover, the production instruction input reception unit 351 stores the process, the item code of each item used in the process, and the like which are acquired in the process described above, as a production process 811, an item code 813, and the like, in the production instruction information table 361. The production instruction input reception unit 351 compares the child item code 602 contained in each combination acquired in the above-mentioned process with each item code 813 already stored in the production instruction information table 361, and selects the matching codes. Subsequently, the production instruction input reception unit 351 stores the instruction count, the required quantity, the unit 604, and the like contained in the matching combination in the instruction count 812, the required quantity 814, the unit 815, and the like of the row containing the matching item code 813.

On the production site, the products are produced, for example, by referring to the thus-generated production instruction information table 361.

Figure 21:
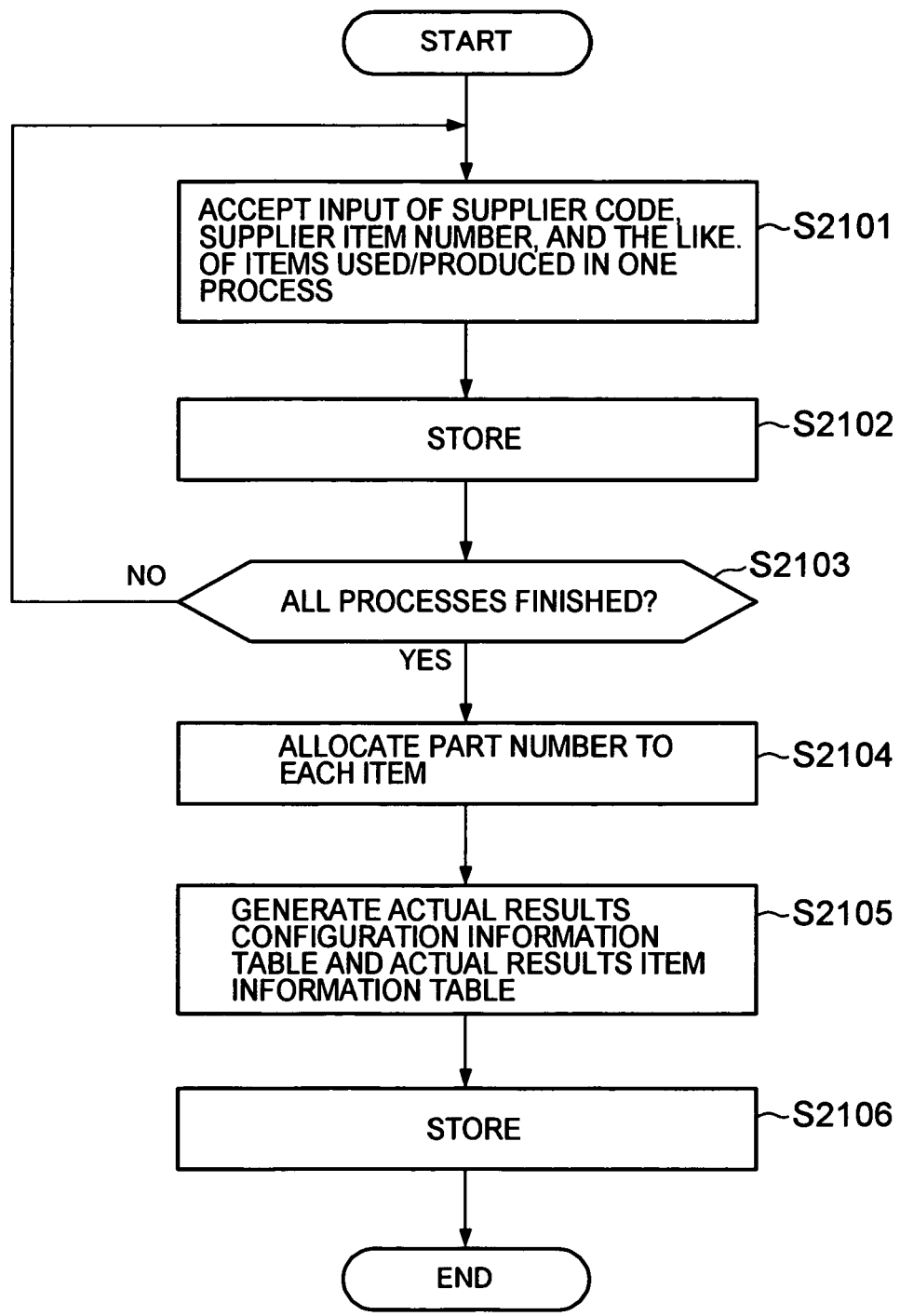
FIG. 21 is a diagram showing another operational example of storing the actual results information at the production stage in the embodiment.

Next, an operational example of generating the actual results information table 161, the actual results configuration information table 162, the actual results item information table 163, and the like from the information on the items used for actually producing the product, for example, will be described with reference to FIG. 21. Note that this operational example corresponds to S1609 of FIG. 16 described above.

The operator at each workshop in the production line outputs the production instruction information table 361 to the output device 305 of the production management terminal 122 on a production process basis, for example, then takes the items needed for producing the product from a warehouse, and performs the working process, the assembling process and so on. At this time, the operator at each workshop inputs the supplier code, the supplier item number, the lot number, and the like, for each item used in the production process via the input device 304 of the production management terminal 122. The production record input reception unit 353 of the production management terminal 122, when receiving the inputted information (S2101), stores the information in the actual results information table 161 (S2102).

Specifically, for example, the operator inputs the production instruction number and the information input process by employing the input device 304 of the production management terminal 122. The production record input reception unit 353 refers to the production instruction information table 361 containing the production instruction number 801 matching the inputted production instruction number, and reads the item code 813 associated with the production process 811 matching the inputted process from the production instruction information table 361. The production record input reception unit 353 outputs, to the output device 305, such as the display, a screen, containing the inputted process and the read item code, for receiving the supplier code, the supplier item number, the lot number, and the like for each item code. The operator inputs the supplier code, the supplier item number, the lot number, and the like for each item code, via the input device 304. The production record input reception unit 353 registers the production instruction number 801, the item code 802, the product production instruction count 803, the lot number 804, and the like, which are read from the production instruction information table 361 referred in the process described above, as a production instruction number 1001, an item code 1002, a product production instruction count 1003, a lot number 1004, and the like in the actual results information table 161. Moreover, the production record input reception unit 353 registers the production process 811 matching the inputted process, the item code 813 associated with the production process 811 and the like, as the manufacturing production process 1011, the item code 1012, and the like, in the actual results information table 161. The production record input reception unit 353 registers the supplier code, the supplier item number, the lot number, and the like, per item code, which are inputted in the process described above, as the supplier code 1013, the supplier item number 1014, the lot number 1015, and the like, each associated with the previously registered item code 1012 in the actual results information table 161.

The production record input reception unit 353 determines whether or not the supplier code, the supplier item number, the lot number, and the like, have been registered for all of the processes and items of the product under production (S2103).

As a result of the determination in S2103, if the supplier code, the supplier item number, the lot number, and the like, are not yet registered for all of the processes and items of the product under production, the production record input reception unit 353 again executes the processes from S2101 onward as described above.

As a result of the determination in S2103, if the supplier code, the supplier item number, the lot number, and the like, have been registered for all of the processes and items of the product under production, the production record input reception unit 353 assigns the part number to each of the whole items that make up the product under production (S2104), and further generates the actual results configuration information table 162 and the actual results item information table 163 from the actual results information table 161, the item information table 151, and the like. (S2105).

Specifically, for example, the production record input reception unit 353, at first, reads the production instruction number 1001, the item code 1002, the product production instruction count 1003, the lot number 1004, and the like, from the actual results information table 161 generated in the process described above, and stores these pieces of data as a production instruction number 1101, an item code 1102, a product production instruction count 1103, a lot number 1104, and the like, in the actual results configuration information table 162. Furthermore, the production record input reception unit 353 stores the production instruction number 1001, the item code 1002, the product production instruction count 1003, the lot number 1004, and the like, read from the actual results information table 161 generated in the process described above as a production instruction number 1201, an item code 1202, a product production instruction count 1203, a lot number 1204, and the like, in the actual results item information table 163.

Next, the production record input reception unit 353 selects one of the rows, in the descending order, each containing the production process 1011, the item code 1012, the supplier code 1013, the supplier item number 1014, the lot number 1015, and the like, in the actual results information table 161 generated in the process described above, and issues the part number of the item specified by the item code of the selected row. It is to be noted that the part number can be issued using an arbitrary technology, and the part number may be issued in a way that combines a serial number with, for example, an arbitrary code determined from the member, the component, the intermediate product, the main member, and the like. Next, the production record input reception unit 353 stores the issued part number, and the item code 1012, the supplier code 1013, the supplier item number 1014, the lot number 1015, and the like, of the selected row in the part number 1201, the item code 1212, the supplier code 1213, the supplier item number 1204, the lot number 1215, and the like, in the actual results item information table 163. The production record input reception unit 353 executes this process on all of the rows in the actual results information table 161.

Moreover, the production record input reception unit 353 selects the row containing the parent item code 601 matching the item code of the product to be produced, from the item information table 151 of the design information management device 124, and reads the parent item code 601, the child item code 602, the item count 603, the unit 604, and the like, of the selected row. Next, the production record input reception unit 353 selects the row containing the item code 1212 matching the read parent item code 601 from the actual results item information table 163, and reads the part number 1201 contained in the relevant row. Moreover, the production record input reception unit 353 selects the row containing the item code 1212 matching the read child item code 602 from the actual results item information table 163, and reads the part number 1201 contained in the relevant row. The production record input reception unit 353 registers the part number 1201 of the read parent item code 601, the part number 1201 of the child item code 602, the item count 603, the unit 604, and the like, as the parent part number 1101, the child part number 1102, the item count 1113, the unit 1114, and the like, in the actual results configuration information table 162. Subsequently, the production record input reception unit 353 selects the row containing the parent item code 601 matching the child item code 602 read immediately before from the item information table 151 of the design information management device 124, and reads the parent item code 601, the child item code 602, the item count 603, the unit 604, and the like, of the selected row. Next, the production record input reception unit 353 selects the row containing the item code 1212 matching the read parent item code 601 from the actual results item information table 163, and reads the part number 1201 contained in the relevant row. Further, the production record input reception unit 353 selects the row containing the item code 1212 matching the read child item code 602 from the actual results item information table 163, and reads the part number 1201 contained in the relevant row. The production record input reception unit 353 registers the part number 1201 of the read parent item code 601, the part number 1201 of the child item code 602, the item count 603, the unit 604, and the like as the parent part number 1101, the child part number 1102, the item count 1113, the unit 1114, and the like in the actual results configuration information table 162. The production record input reception unit 353 repeats this process till the child item code 602 of the selected row becomes "-".

The production record registering unit 354 registers the thus-generated actual results information table 161, the actual results configuration information table 162, the actual results item information table 163, and the like, in the actual results information management device 125 (S2106).

Thus, the correction information table 171 generated upon the design evaluation can be used also for the evaluation of the chemical substance after the production by equalizing the codes for specifying the items in the actual results configuration information table 162 and in the actual results item information table 163 to those in the item information table 151 and the item master information table 152.

Figure 22:
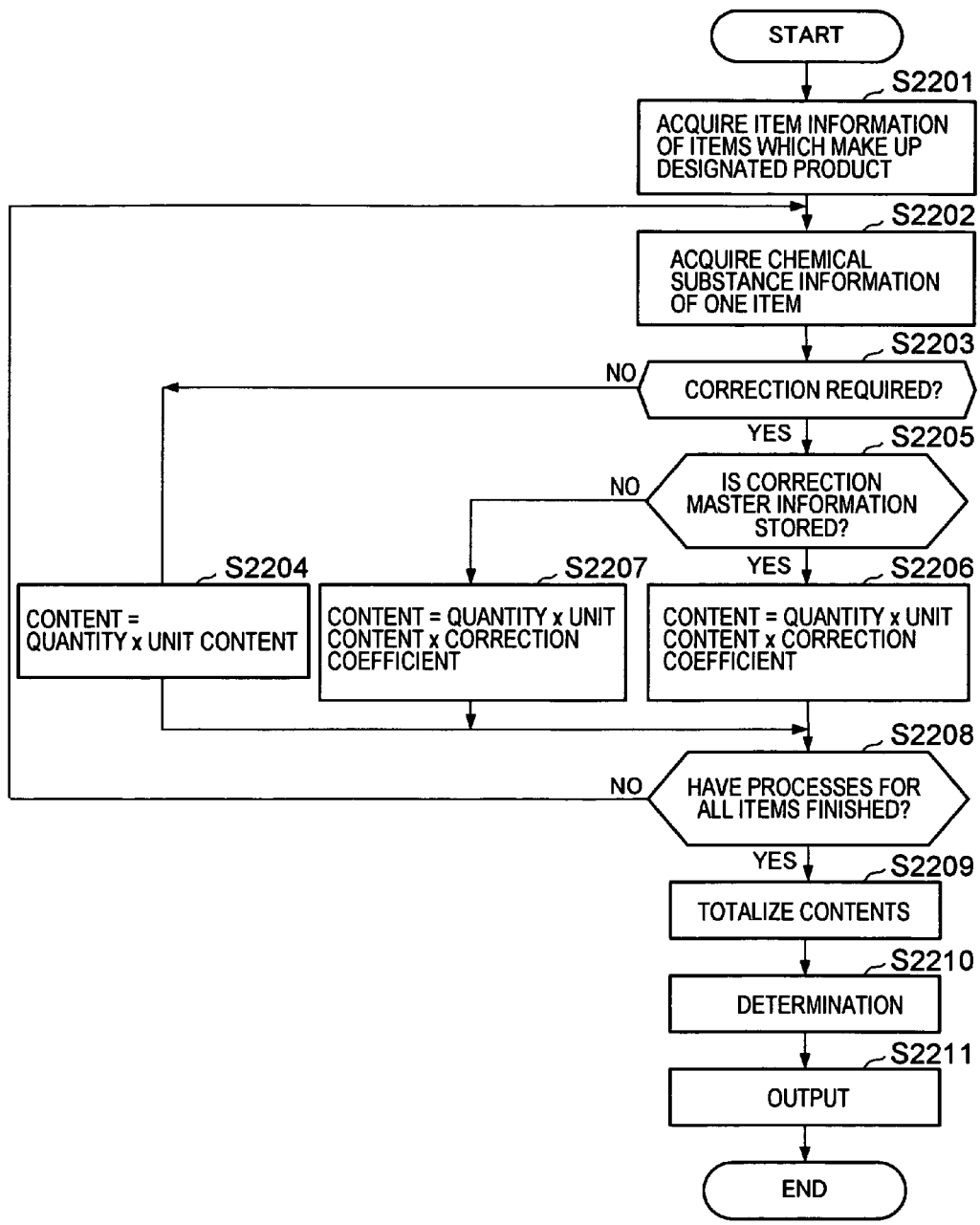
FIG. 22 is a diagram showing an operational example of calculating content of a chemical substance at the production stage in the embodiment.

Next, an operational example of calculating the environmental load of the post-production product will be described with reference to FIG. 22. Note that this operational example corresponds to S1610 to S1613 of FIG. 16 illustrated above.

Note that the timing of starting up the operation, which will be described below, may be set arbitrarily. For example, the evaluation terminal 123 monitors the update of the actual results configuration information table 162, the actual results item information table 163, and the like, in the actual results information management device 125 by polling or the like, at predetermined time intervals, and when an update thereof is detected, may start up the following operation. Further, the operator may also prescribe the startup of the operation. Still further, the evaluation terminal 123 may start up the operation at a predetermined time.

The item information acquisition unit 451 of the evaluation terminal 123 acquires the actual results configuration information table 162 and the actual results item information table 163 that are stored with the information on items from which the evaluation target product is composed (S2201). Specifically, for instance, the item information acquisition unit 451, when starting up the operation upon detecting the update of the actual results configuration information table 162, the actual results item information table 163, or the like, reads the updated actual results configuration information table 162 and the updated actual results item information table 163 from the actual results information management device 125. Moreover, for example, the item information acquisition unit 451, in the case of starting up the operation based on the instruction of the operator and the like, reads the actual results configuration information table 162, the actual results item information table 163, and the like, each containing the production instruction number and the like, inputted via the input device 404 of the evaluation terminal 123, from the actual results information management device 125.

The chemical substance information acquisition unit 452 of the evaluation terminal 123 selects one of the items from which the product is composed, and acquires the chemical substance information of the selected item (S2202). To do this, the chemical substance information acquisition unit 452 selects one row in descending order, by referring to, for example, the actual results item information table 163, and reads a combination of an part number 1211, an item code 1212, a supplier code 1213, a supplier item number 1214, a lot number 1215, and the like, of the selected row.

Next, the chemical substance information acquisition unit 452 selects the row containing the supplier code 501, the supplier item number 502 and the lot number 503 matching each combination of the supplier code 1213, the supplier item number 1214, the lot number 1215, and the like, which are read in the process described above, from the chemical substance information table 181 of the chemical substance information management device 112, and reads the substance code 504, the content 505 and the registration unit 506 of the selected row. The chemical substance information acquisition unit 452 of the evaluation terminal 123 stores, in the predetermined area of the memory 402, the acquired information together with the part number 1211, the item code 1212, the supplier code 1213, the supplier item number 1214, the lot number 1215, and the like, which are selected and read in the process described above.

Subsequently, the evaluation unit 253 determines whether the correction information of the item of which the chemical substance information is acquired in the process in S2202 described above is needed or not (S2203). Specifically, for example, the chemical substance information acquisition unit 452 refers to the combination of the part number, the item code, the supplier code, the supplier item number, the lot number, the substance code, the content, the registration unit, and the like, that is acquired in the process in S2202, and extracts the registration unit of this combination. Further, the chemical substance information acquisition unit 452 selects the row containing the child part number 1112 matching the part number in the combination given above, from the actual results configuration information table 162, and reads the unit 1114 of the selected row. The chemical substance information acquisition unit 452 determines whether or not the registration unit extracted in the process given above matches the read unit 1114. As a result of this determination, if the unit does not match, it can be determined there is a discrepancy in the item of which the chemical substance information is acquired in the process in S2202 described above, between the unit used in the production process and the registration unit of the chemical substance information registered by the supplier, i.e., it can be determined that correction information is required.

As a result of the determination in S2203, if the correction information is not required, the calculation unit 454 calculates the content of the chemical substance of the item whose chemical substance information is acquired in the process in S2202 described above (S2204). To do this, for example, the calculation unit 454 calculates the content using the following equation for each of the chemical substances contained in the item of which the chemical substance information is acquired in the process in S2202 described above.

$$\text{Content} = \text{Quantity} \times \text{Unit Content} \quad \text{(Equation 1)}$$

This equation is the same as the equation employed for the process in S1705 described above, and hence a detailed explanation thereof is omitted.

As a result of the determination in S2203, if the correction information is required, the chemical substance information acquisition unit 452 determines whether or not the correction information of the item whose chemical substance information is acquired in the process in S2202, is stored in the correction master information table 172 (S2205). To do this, for example, the chemical substance information acquisition unit 452 refers to the respective rows in the correction master information table 172, and determines whether or not a combination in which the registration unit extracted in the process described above, and the read unit 1114 match, is stored as the unit 1401 and the registration unit 1402. As a result of this determination, if the combination is stored, the chemical substance information acquisition unit 452 determines the correction coefficient 1403 in this row in the correction master information table 172 to be the correction information of this unit, and reads the correction coefficient 1403.

As a result of the determination in S2205, if the correction information is stored in the correction master information table 172, the chemical substance information acquisition unit 452 calculates the content of the chemical substance of the item whose chemical substance information is acquired in the process in S2202 (S2206). To do this calculation, for example, the chemical substance information acquisition unit 452 calculates the content using the following equation for each of the chemical substances contained in the item whose chemical substance information is acquired in the process in S2202.

$$\text{Content} = \text{Quantity} \times \text{Unit Content} \times \text{Correction Coefficient} \quad \text{(Equation 2)}$$

This equation is the same as the equation employed for the process in S1707 described above, and hence a detailed explanation thereof is omitted.

On the other hand, as a result of the determination in S2205, if the correction information is not stored in the correction master information table 172, the correcting unit 453 determines that the correction information of the item whose chemical substance information is acquired in the process in S2202, is stored in the correction information table 171. The calculation unit 454 calculates the content of the chemical substance of this item (S2207). To do this calculation, for example, the calculation unit 454 selects the row containing the item code 1301, the supplier code 1302, and the supplier item number 1303 of the item whose chemical substance information is acquired in the process in S2202, from, for example, the correction master information table 172, and reads the correction information 1306 in the selected row. Subsequently, the calculation unit 454 calculates the content using the following equation for each of the chemical substances contained in the item whose chemical substance information is acquired in the process in S2202.

$$\text{Content} = \text{Quantity} \times \text{Unit Content} \times \text{Correction Coefficient} \quad \text{(Equation 3)}$$

This equation is the same as the equation employed for the process in S1709 described above, and hence a detailed explanation thereof is omitted.

After the processes in S2204, S2206, and S2207, the calculation unit 454 determines whether or not the processes described above are executed for all of the items from which the product is composed (S2208).

As a result of the determination in S2208, if there is an item on which the processes described above are not performed, the evaluation unit 253 again executes the processes from S2202 onward as described above on this item.

As a result of the determination in S2208, if there is no item on which the processes described above are not performed, the evaluation unit 253 adds up, for each chemical substance, the contents per item that are calculated in S2204, S2206 and S2207 (S2209). Specifically, for instance, the calculation unit 454 adds, for each chemical substance, all of the values calculated in the processes in S2204, S2206 and S2207 described above.

Next, the calculation unit 454 determines whether or not the content added up for each chemical substance satisfies the prescribed value (S2210). This process is the same as S1715 described above, and hence a detailed description thereof is omitted. Further, the calculation unit 454 stores the production instruction number 1201, the item code 1202, the item name 1203, the lot number 1204, and the like, read from the actual results item information table 163 of the evaluation target product, as a production instruction number 1501, an item code 1502, an item name 1503, a lot number 1504, and the like, in the evaluation information table 461. Moreover, the calculation unit 454 stores the name of each of the chemical substances added up in S2209 described above, the total value of the contents of the respective chemical substances, and the determination result showing whether or not the content added up for each chemical substance satisfies the prescribed value, in the respective fields of the chemical substance 1511, the content 1512 and the result 1512 in the evaluation information table 461.

Figure 23:
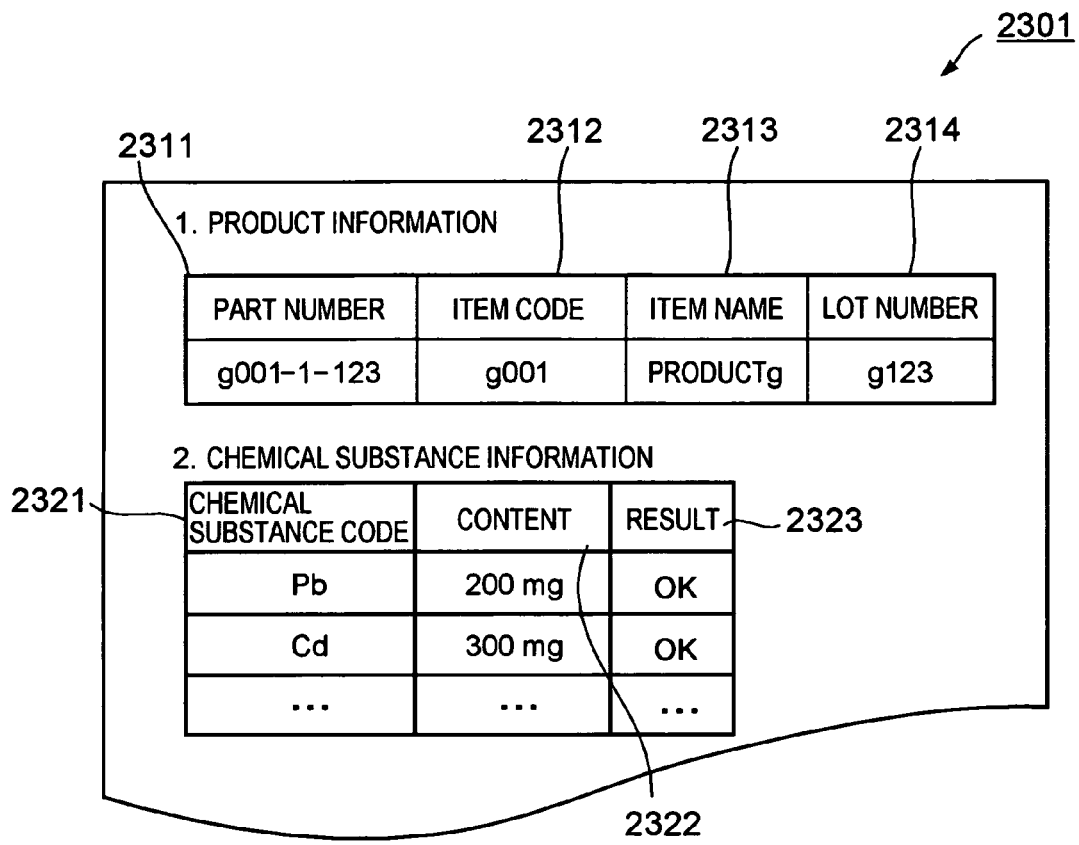
FIG. 23 is a diagram showing an example of a screen for outputting the calculated content of chemical substances in the embodiment.

The output unit 456 outputs the information in the evaluation information table 461 to the output device 405 (S2211). FIG. 23 illustrates an example of the output to the output device 405, such as a display. FIG. 23 illustrates an example of outputting the evaluation information table 461 shown by way of one example in FIG. 15, to a screen 2301. The screen 2301 displays the contents of the chemical substances of the product having a part number 2311 "g001-1-123", an item code 2312 "g001" and a lot number 2313 "g123", where content 2316 of a chemical substance code 2314 "Pb (lead)" is "200 mg", and the content 2316 of the chemical substance code 2314 "Cd (cadmium)" is "300 mg". The determination result of each of these contents is a result 2323 "OK".

Heretofore, in the process of totalizing the values of the environmental loads of the post-production product, if there is an item having mismatched units, the number of processes of modifying the system on the production side increases, or alternatively there is a possibility of causing an increase in the number of processes of registering the values of the environmental loads on the side of the supplier.

According to the technology of the present embodiment, the post-production evaluation can be done by use of the same information as the correction information generated when designed. Namely, the correction information is registered only when designing the product, and therefore the registration thereof may be performed once per product. This scheme enables the number of processes of modifying the system on the production side to be reduced. Moreover, the correction is conducted by using the same information as the correction information when designed, so that conditions for calculating the evaluation value can be made the same in designing and in production.

Further, the supplier can arbitrarily register the unit of the environmental load information. Accordingly, any increase does not occur in the number of the processes of registering the environmental load information on the side of the supplier.

Still further, there is no need for production process to change the units of the items used for producing the product. Hence, there is no necessity to change the existing production management system, and the system can be built up with a smaller number of development processes.

Hereinabove, the embodiment of the present invention has been discussed in detail with reference to the drawings; however, specific configurations are not limited to the present embodiment and the present invention includes design changes and the like within a scope that does not deviate from the spirit of the present invention.

For example, the embodiment discussed above describes an example applied to the evaluation of the chemical substances contained in the product; however, the application is not limited thereto, and the present invention can also be applied to the evaluation of LCA, for example.

Furthermore, for example, the abovementioned functions and tables may be distributed among a plurality of devices, or may be in a single device.

Moreover, for instance, each business facility may further include one or more pieces of information processing devices which store a program for realizing the functions described above, in the storage device, where the design terminal, the production management terminal, the evaluation terminal, and the like, may be connected to a information processing device. In this case, the information processing device may output, to the design terminal, the production management terminal, the evaluation terminal, the information for getting the aforementioned information inputted, and execute processing according to information inputted from the respective terminals. Namely, a main body possessing the functions described above may be set arbitrarily.

What is claimed is:

1. A method for calculating an environmental load value when designing a product composed of a plurality of items, and the environmental load value of the product produced by a production system, the method carried out in an arrangement comprising:

a design information management device for managing:
a first data table having data items inputted by a designer from a design terminal, of at least a parent-child relationship, an item count of a composition, and a unit of each item of which the product is composed; and
a second data table having data items of at least each item code, a supplier who supplies the items, and a supplier item number;

a chemical substance information management apparatus for managing a third data table having data items reported by external suppliers, of at least each item, a substance code contained in the item, content, and a registration unit supplied by the supplier;

a correction information management device for managing a fourth data table having data items of at least an item code, a supplier code of suppliers who supply the items, a registration unit of the chemical substance information registered by the supplier, a unit related to usage of the composition items of the product that are designed, and a correction coefficient which corrects a discrepancy between the registration unit and the unit;

an actual results information management device for managing:
a fifth data table having data items of at least a production instruction code, an item code of the item produced, an item code used in each production process, and a supplier that supplies the item;
a sixth data table having data items of at least a production instruction code, an item code of the item produced, a parent part number and a child part number which indicate a parent-child relationship among each composition item of the item produced, an item count and a unit; and
a seventh data table having data items of at least a part number, an item code, and a supplier code;

said method including:
executing, via a design terminal, operations of:
providing a user interface to a designer, accepting input of each items which compose the product in accordance with a product design to the first data table;
accepting a supplier who supplies each items which compose the product to the second data table;
detecting a discrepancy between a unit of the first data table and a registration unit of the third data table associated with the same item,
guiding input of a coefficient to correct the discrepancy; and
registering the correction coefficient inputted, to the fourth data table;
accepting an instruction for evaluating an environmental load of the objected product from the designer, as an evaluation target product;
searching the first data table for a parent-child relationship and an item count of a composition:
calculating the quantity of each composition item;
referring to the second, the third, and the fourth data tables;
searching content of chemical substance contained in each item of which the product is composed per supplier item;
reading the correction coefficient when there is a discrepancy between the registration units;
calculating total content value per chemical substance; and
determining whether each chemical substance satisfies a prescribed value: and, executing, via a production management terminal, operations of:
providing a user interface to a designer;
accepting production instruction information for producing a product; and
providing the production instruction information to the production site;
assigning a part number to each of the items that make up the product under production; and
generating each data record of the respective fifth, sixth and seventh data tables;

executing, via an evaluation terminal, operations of:
providing a user interface to a designer;
accepting an instruction from an evaluator for an environmental load evaluation of a product after production;
searching the respective fifth, sixth and seventh data tables of the actual results information management unit from item codes of the evaluation target product;
reading data of a parent part number and a child part number, an item count and a unit among each item of which the evaluation target product is composed;
searching content of chemical substance contained in each item of which the product is composed per supplier item of a supplier who supplies items of each part member;

reading and utilizing the correction coefficient when there is a discrepancy between the registration units of the fourth data table; and determining whether each chemical substance satisfies a prescribed value.

2. A system for calculating an environmental load, aiding a precise evaluation of an environmental load value of a product to be produced by a company itself at stages of the product design and after producing the product, comprising:

a design information management device for managing:

a first data table having data items inputted by a designer from a design terminal, of at least a parent-child relationship, an item count of a composition, and a unit of each item of which the product is composed; and a second data table having data items of at least each item code, a supplier who supplies the items, and a supplier item number;

a chemical substance information management apparatus for managing a third data table having data items reported by external suppliers, of at least each item, a substance code contained in the item, content, and a registration unit supplied by the supplier;

a correction information management device for managing a fourth data table having data items of at least an item code, a supplier code of suppliers who supply the items, a registration unit of the chemical substance information registered by the supplier, a unit related to usage of the composition items of the product that are designed, and a correction coefficient which corrects a discrepancy between the registration unit and the unit;

an actual results information management device for managing:

a fifth data table having data items of at least a production instruction code, an item code of the item produced, an item code used in each production process, and a supplier that supplies the item;

a sixth data table having data items of at least a production instruction code, an item code of the item produced, a parent part number and a child part number which indicate a parent-child relationship among each composition item of the item produced, an item count and a unit; and a seventh data table having data items of at least a part number, an item code, and a supplier code;

a design terminal for executing:

providing a user interface to a designer, accepting input of each items which compose the product in accordance with a product design to the first data table; and accepting a supplier who supplies each items which compose the product to the second data table;

detecting a discrepancy between a unit of the first data table and a registration unit of the third data table associated with the same item, guiding input of a coefficient to correct the discrepancy; and registering the correction coefficient inputted, to the fourth data table;

accepting an instruction for evaluating an environmental load of the objected product from the designer, as an evaluation target product;

searching the first data table for a parent-child relationship and an item count of a composition:

calculating the quantity of each composition item;

referring to the second, the third, and the fourth data tables;

searching content of chemical substance contained in each item of which the product is composed per supplier item;

reading the correction coefficient when there is a discrepancy between the registration units;

calculating total content value per chemical substance; and determining whether each chemical substance satisfies a prescribed value:

a production management terminal for executing:

providing a user interface to a designer;

accepting production instruction information for producing a product; and providing the production instruction information to the production site;

assigning part number to each of the items that make up the product under production; and generating each data record of the respective fifth, sixth and seventh data tables; and an evaluation terminal for executing;

providing a user interface to a designer;

accepting an instruction from an evaluator for an environmental load evaluation of a product after production;

searching the respective fifth, sixth and seventh data tables of the actual results information management unit from item codes of the evaluation target product;

reading data of a parent part number and a child part number, an item count and a unit among each item of which the evaluation target product is composed;

searching content of chemical substance contained in each item of which the product is composed per supplier item of a supplier who supplies items of each part member;

reading and utilizing the correction coefficient when there is a discrepancy between the registration units of the fourth data table; and determining whether each chemical substance satisfies a prescribed value.

* * * * *